(12) United States Patent
Ausen et al.

(10) Patent No.: US 10,501,877 B2
(45) Date of Patent: Dec. 10, 2019

(54) NETTINGS, DIES, AND METHODS OF MAKING THE SAME

(71) Applicant: 3M INNOVATIVE PROPERTIES COMPANY, St. Paul, MN (US)

(72) Inventors: Ronald W. Ausen, St. Paul, MN (US); William J. Kopecky, Hudson, WI (US); Thomas P. Hanschen, Mendota Heights, MN (US); Wei Zhang, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 434 days.

(21) Appl. No.: 14/772,117

(22) PCT Filed: Mar. 7, 2014

(86) PCT No.: PCT/US2014/021494
§ 371 (c)(1),
(2) Date: Sep. 2, 2015

(87) PCT Pub. No.: WO2014/164242
PCT Pub. Date: Oct. 9, 2014

(65) Prior Publication Data
US 2016/0002838 A1 Jan. 7, 2016

Related U.S. Application Data

(60) Provisional application No. 61/779,997, filed on Mar. 13, 2013.

(51) Int. Cl.
*D04H 13/00* (2006.01)
*D04H 3/147* (2012.01)
(Continued)

(52) U.S. Cl.
CPC ............ *D04H 13/00* (2013.01); *B29C 48/11* (2019.02); *D04H 3/147* (2013.01); *B29L 2028/00* (2013.01)

(58) Field of Classification Search
CPC .......... D01D 5/34; D04H 3/018; D04H 3/147; D04H 13/00; Y10T 442/186; B29C 48/11; B29L 2028/00
See application file for complete search history.

(56) References Cited

U.S. PATENT DOCUMENTS 3,012,275 A   12/1961  Nalle, Jr.
3,019,147 A   1/1962  Nalle, Jr.
(Continued)

FOREIGN PATENT DOCUMENTS

EP   0097496   1/1984
GB   2262906   7/1993
(Continued)

OTHER PUBLICATIONS

International Search Report PCT International Application No. PCT/US2014/021494, dated May 21, 2014, 4 pages.

*Primary Examiner* — Elizabeth C Imani
(74) *Attorney, Agent, or Firm* — James A. Baker; Gregory D. Allen

(57) ABSTRACT

Netting (100) comprising an array of polymeric strands (121, 122) periodically joined together at bond regions (113) throughout the array, and methods and dies for making the same. Nettings described herein have a variety of uses, including wound care and other medical applications, filtration, absorbent articles, pest control articles, and geotextile applications.

9 Claims, 15 Drawing Sheets

(51) Int. Cl.
   *B29L 28/00* (2006.01)
   *B29C 48/11* (2019.01)

(56) References Cited

U.S. PATENT DOCUMENTS

| | | | |
|---|---|---|---|
| 3,032,008 A | 5/1962 | Land | |
| 3,054,148 A | 9/1962 | Zimmerli | |
| 3,178,328 A | 4/1965 | Tittmann | |
| 3,302,501 A | 2/1967 | Greene | |
| 3,394,211 A | 7/1968 | Macduff | |
| 3,471,588 A | 10/1969 | Kanner | |
| 3,471,597 A | 10/1969 | Schirmer | |
| 3,498,873 A | 3/1970 | Schrenk | |
| 3,505,157 A * | 4/1970 | Fields | B29C 43/222 428/135 |
| 3,831,741 A | 8/1974 | Poupitch | |
| 3,932,092 A | 1/1976 | Hureau | |
| 4,038,008 A | 7/1977 | Larsen | |
| 4,384,022 A | 5/1983 | Fowler | |
| 4,472,328 A | 9/1984 | Sugimoto | |
| 4,634,485 A | 1/1987 | Welygan | |
| 4,636,419 A | 1/1987 | Madsen | |
| 4,656,075 A | 4/1987 | Mudge | |
| 4,661,389 A | 4/1987 | Mudge | |
| 4,732,723 A | 3/1988 | Madsen | |
| 4,933,081 A | 6/1990 | Sasaki | |
| 5,077,870 A | 1/1992 | Melbye | |
| 5,156,495 A * | 10/1992 | Mercer | B29D 28/00 405/262 |
| 5,660,778 A | 8/1997 | Ketcham | |
| 5,679,379 A | 10/1997 | Fabbricante | |
| 5,811,186 A | 9/1998 | Martin | |
| 5,948,517 A | 9/1999 | Adamko | |
| 5,972,463 A | 10/1999 | Martin | |
| 6,083,856 A | 7/2000 | Joseph | |
| 6,093,663 A | 7/2000 | Ouellette | |
| 6,228,449 B1 | 5/2001 | Meyer | |
| 6,240,817 B1 | 6/2001 | James | |
| 6,348,249 B2 | 2/2002 | Meyer | |
| 6,391,420 B1 | 5/2002 | Cederblad | |
| 6,465,107 B1 | 10/2002 | Kelly | |
| 6,692,606 B1 | 2/2004 | Cederblad | |
| 6,994,904 B2 | 2/2006 | Joseph | |
| 7,329,621 B2 | 2/2008 | Collier, IV | |
| 7,335,273 B2 | 2/2008 | Neculescu | |
| 7,591,903 B2 | 9/2009 | Maier | |
| 7,846,504 B2 | 12/2010 | Maier | |
| 8,758,882 B2 | 6/2014 | Ausen | |
| 8,889,243 B2 | 11/2014 | Hanschen | |
| 2001/0008690 A1 | 7/2001 | Okamoto | |
| 2007/0199654 A1 | 8/2007 | Kohel | |
| 2011/0092123 A1 | 4/2011 | Gupta | |
| 2013/0004723 A1 | 1/2013 | Ausen | |
| 2013/0004729 A1 | 1/2013 | Ausen | |
| 2013/0009336 A1 | 1/2013 | Ausen | |
| 2013/0011600 A1 | 1/2013 | Ausen | |
| 2014/0220328 A1 | 8/2014 | Ausen | |
| 2014/0234606 A1 | 8/2014 | Ausen | |

FOREIGN PATENT DOCUMENTS

| | | |
|---|---|---|
| JP | 52-107371 | 9/1977 |
| JP | 61-189927 | 8/1986 |
| JP | 06-116856 | 4/1994 |
| WO | WO 1996/39349 | 12/1996 |
| WO | WO 1998/02300 | 1/1998 |
| WO | WO 2008/148797 | 12/2008 |
| WO | WO 2010/098792 | 9/2010 |
| WO | WO 2012/112768 | 8/2012 |
| WO | WO 2013/032683 | 3/2013 |
| WO | WO 2013/052371 | 4/2013 |
| WO | WO 2013/148128 | 10/2013 |

* cited by examiner

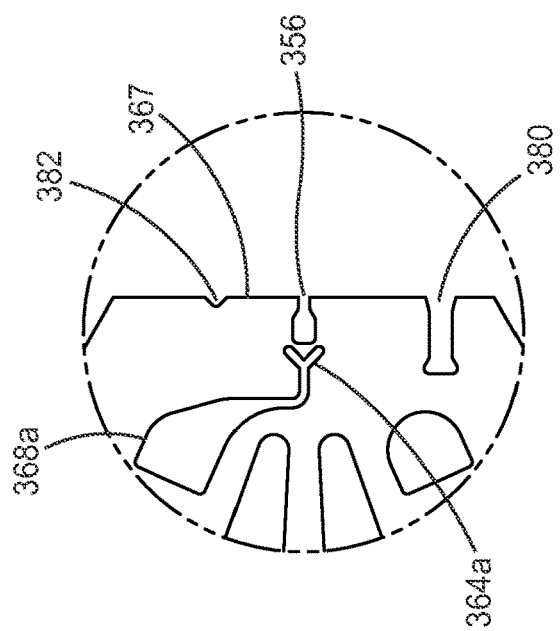
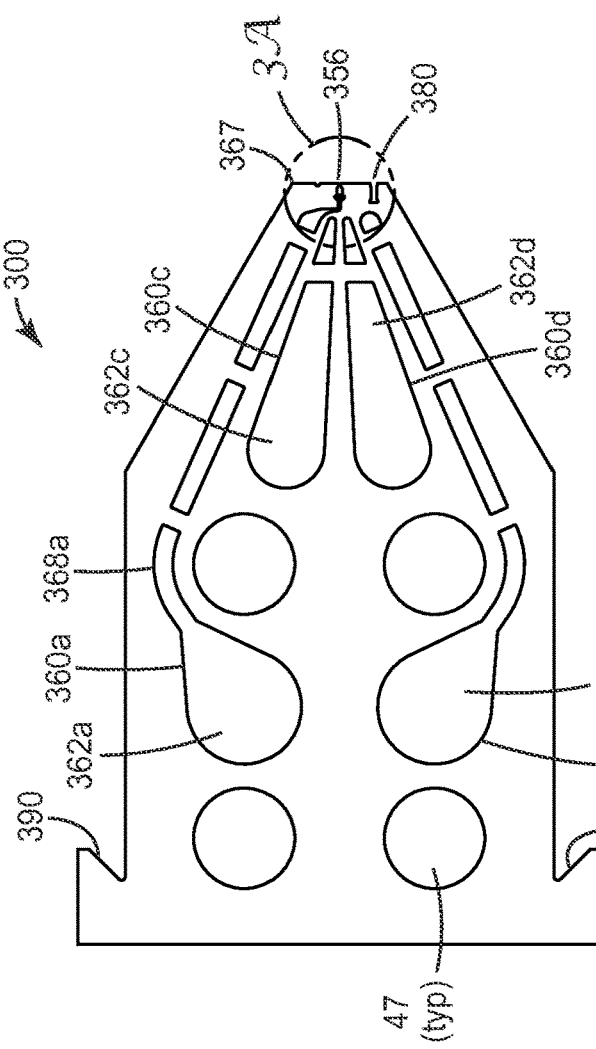

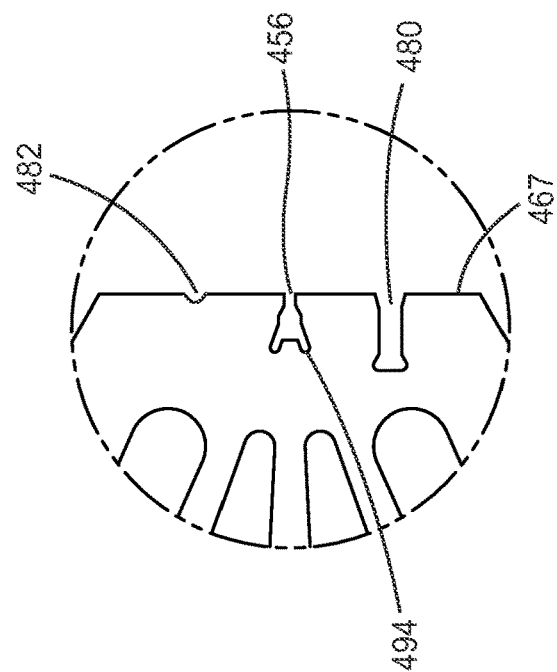
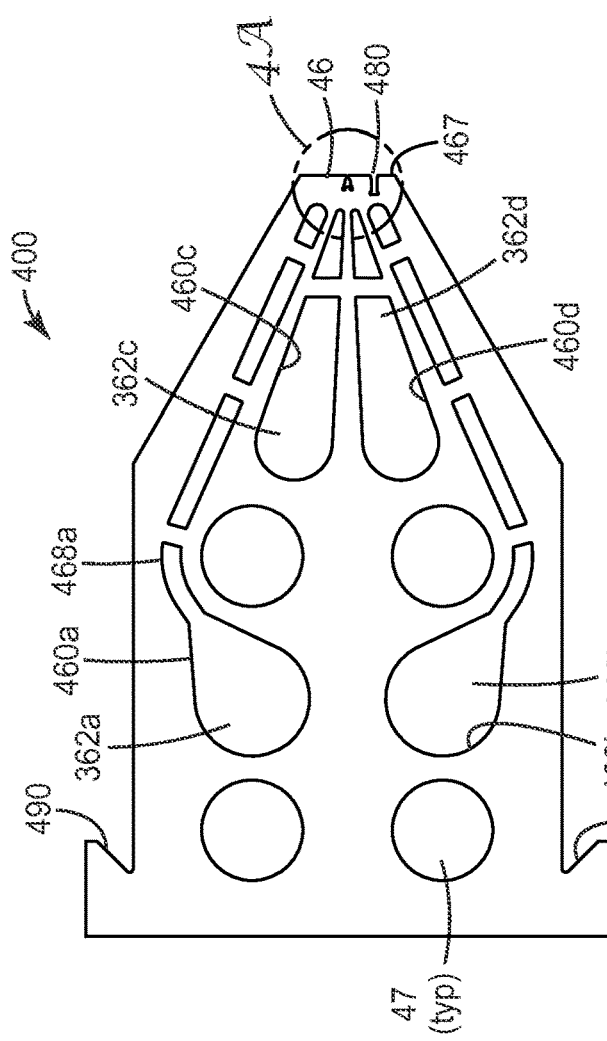
FIG. 4A
FIG. 4

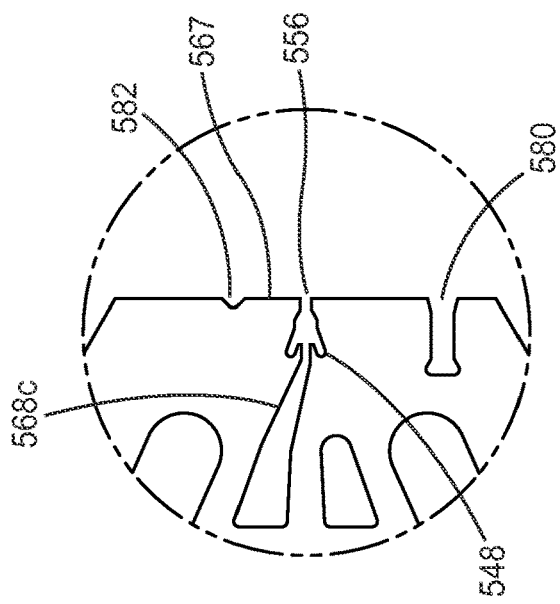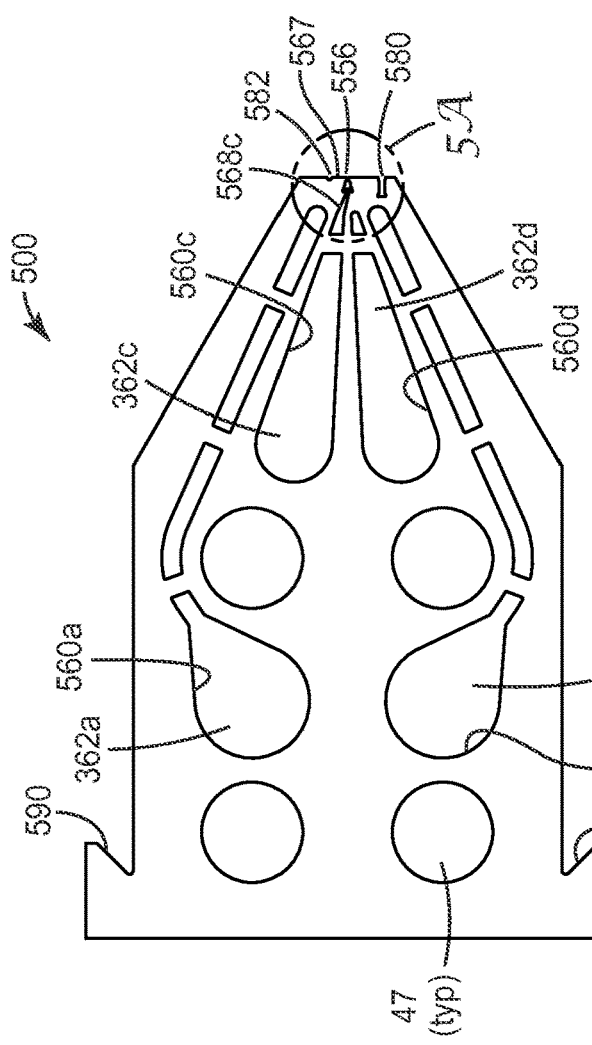

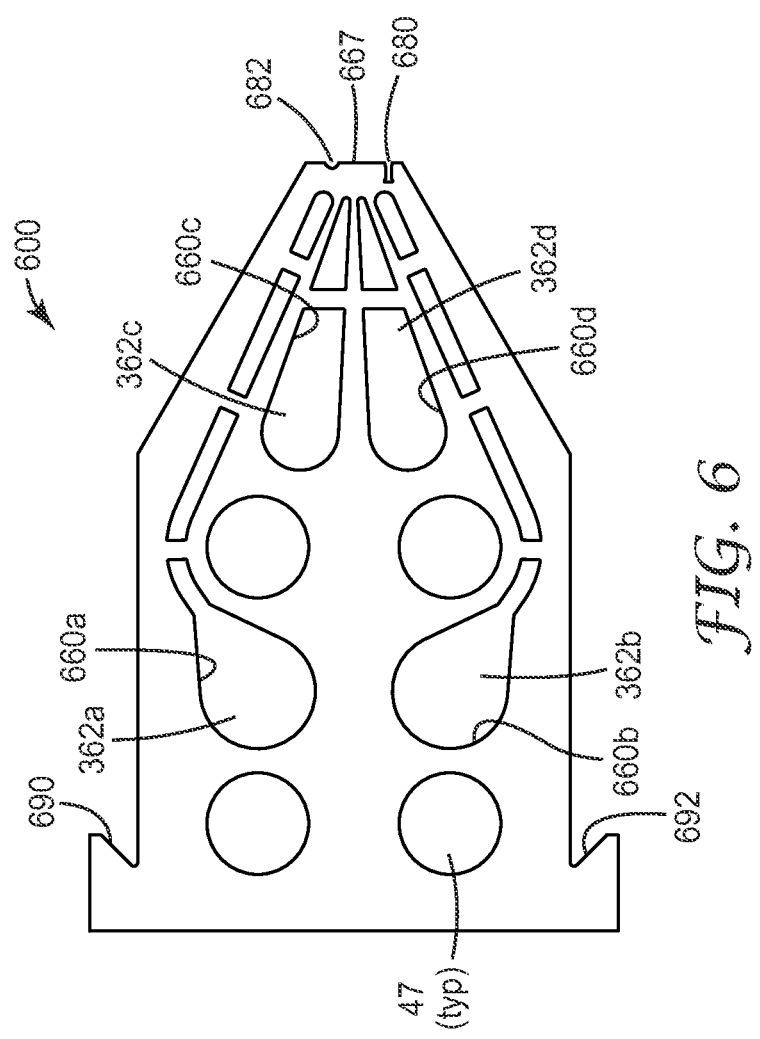

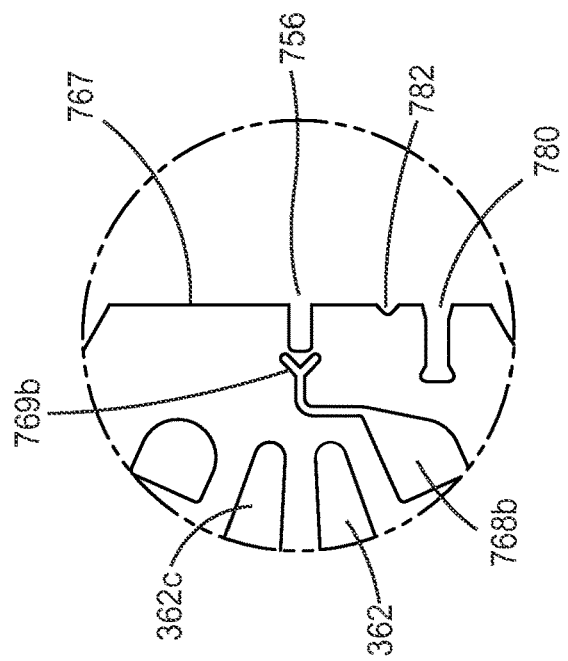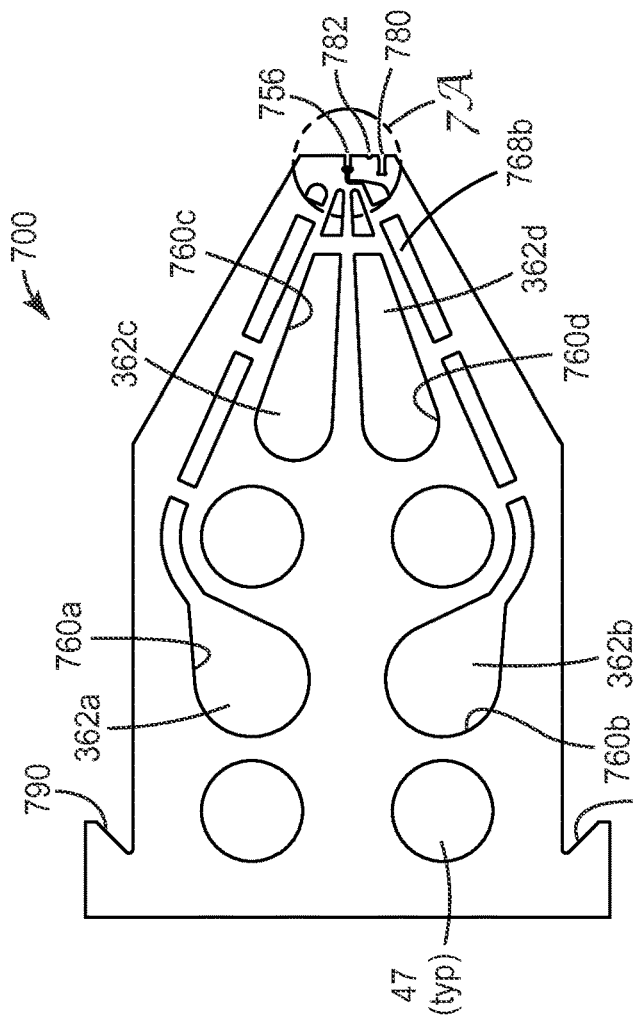

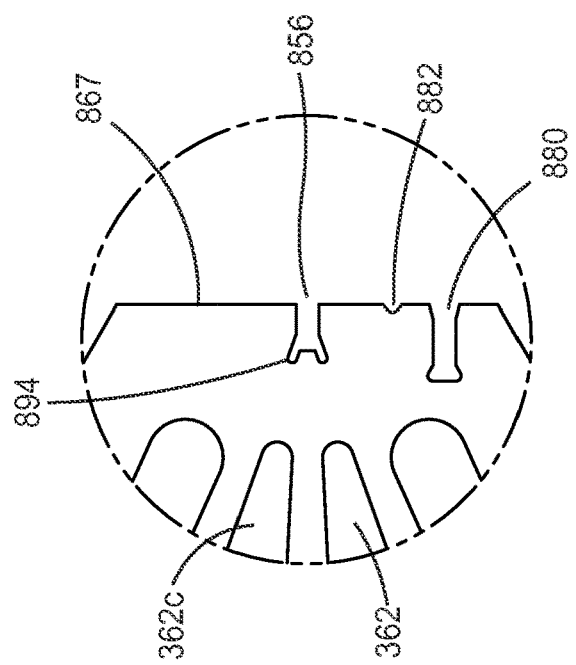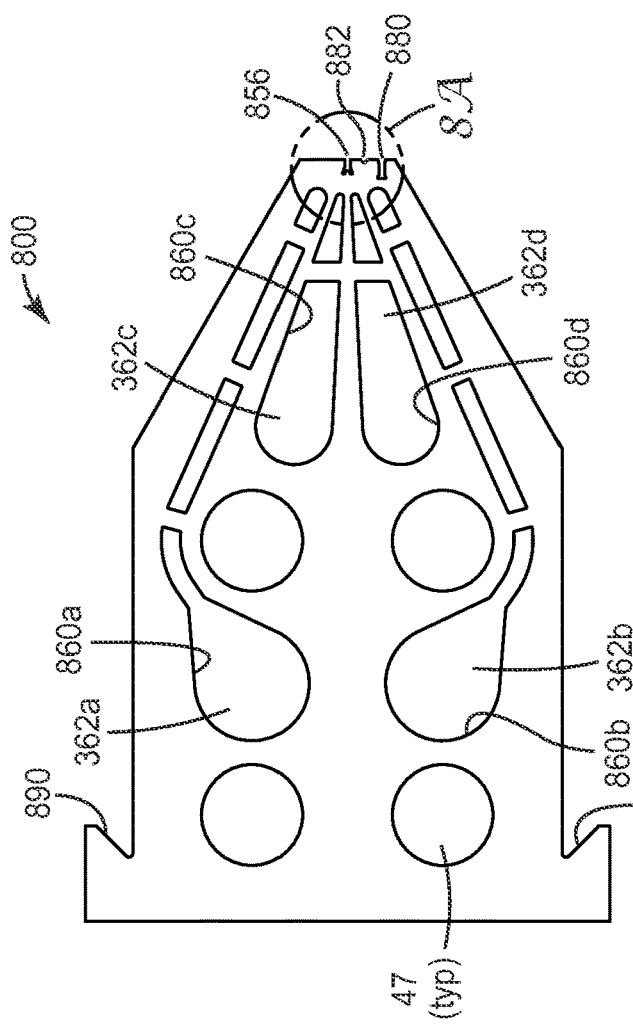

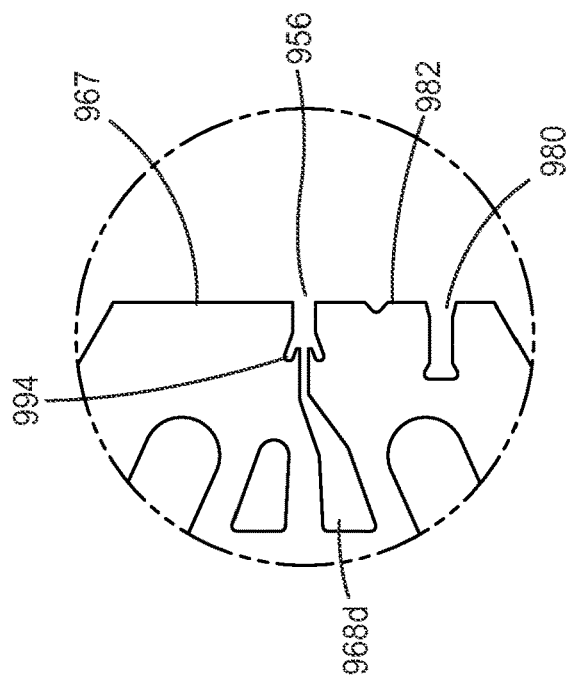
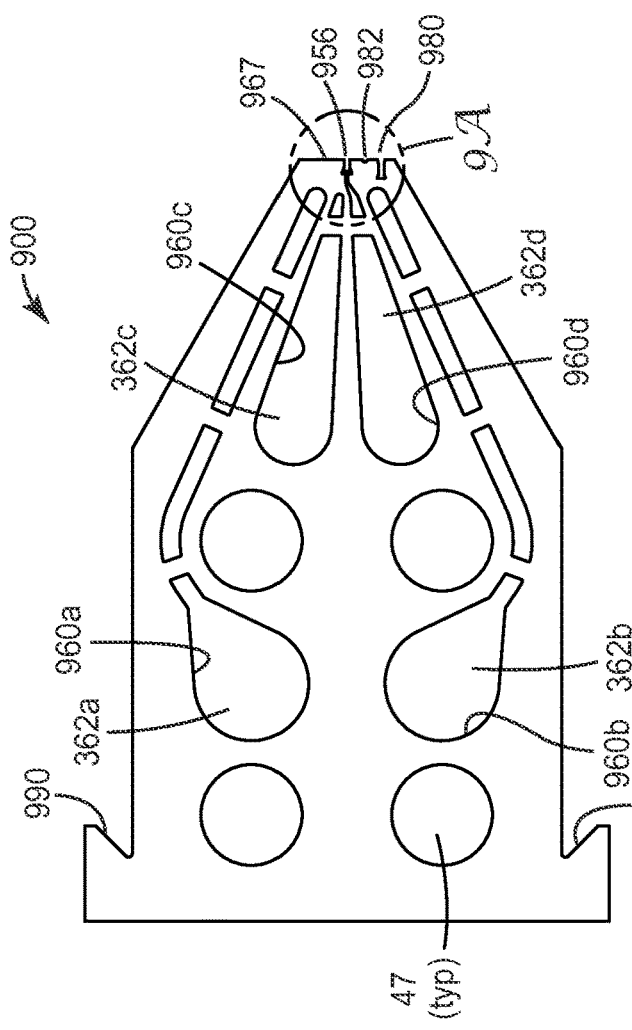

NETTINGS, DIES, AND METHODS OF MAKING THE SAME

CROSS REFERENCE TO RELATED APPLICATIONS

This application is a national stage filing under 35 U.S.C. 371 of PCT/US2014/021494, filed Mar. 7, 2014, which claims priority to U. S. Provisional Application No. 61/779,997, filed Mar. 13, 2013, the disclosure of which is incorporated by reference in its/their entirety herein.

BACKGROUND

Polymeric nets are used for a wide variety of applications, including reinforcement of paper articles or cheap textiles (e.g., in sanitary paper articles, paper cloth, and heavy duty bags), non-woven upholstery fabrics, window curtains, decorative netting, wrapping material, mosquito netting, protective gardening netting against insects or birds, backing for growing of grass or plants, sport netting, light fishing netting, and filter materials.

Extrusion processes for making polymeric nets are well known in the art. Many of these processes require complex dies with moving parts. Many of these processes can only be used to produce relatively thick netting with relatively large diameter strands and/or relatively large mesh or opening sizes.

Polymeric netting can also be obtained from films by slitting a pattern of intermittent lines, which are mutually staggered, and expanding the slit film while stretching monoaxially or biaxially. This process tends to produce netting of a relatively large mesh and with relatively weak cross-points.

There exists a need for alternative netting compositional arrangements and the characteristics they offer, as well as methods to make the alternative netting compositional arrangements.

SUMMARY

In one aspect, the present disclosure describes a first netting comprising an array of polymeric strands periodically joined together at bond regions throughout the array, the netting has first and second, generally opposed major surfaces, wherein the bond regions are generally perpendicular to the first and second major surfaces, wherein the array comprises a first plurality of strands having first and second, generally opposed major surfaces, wherein the array comprises a second plurality of strands having first and second, generally opposed major surfaces, wherein the first major surface of the netting comprises the first major surfaces of the first and second plurality of strands, wherein the second major surface of the netting comprises the second major surfaces of the first and second plurality of strands, wherein the first major surface of the first plurality of strands comprises a first material, wherein the second major surface of the first plurality of strands comprises a second material, wherein the first major surface of the second plurality of strands comprises a third material, wherein the second major surface of the second plurality of strands comprises a fourth material, wherein the first and second materials are different, and wherein the first material does not extend to the second major surface of the first plurality of strands. In some embodiments, the third material does not extend to the second major surface of the second plurality of strands. In some embodiments, at least two of the first, third, and fourth materials are the same. In some embodiments, at least three of the first, second, third, or fourth materials are the different. In some embodiments, the netting further comprises a fifth, different material between the first and second materials, and optionally a sixth, different material between the third and fourth materials.

In another aspect, the present disclosure describes a second netting comprising an array of polymeric strands periodically joined together at bond regions throughout the array, the netting has first and second, generally opposed major surfaces, wherein the bond regions are generally perpendicular to the first and second major surfaces, wherein the array comprises a first plurality of strands having first and second, generally opposed major surfaces, wherein the array comprises a second plurality of strands having first and second, generally opposed major surfaces, wherein the first major surface of the netting comprises the first major surfaces of the first and second plurality of strands, wherein the second major surface of the netting comprises the second major surfaces of the first and second plurality of strands, wherein the first major surface of the first plurality of strands comprises a first material, wherein the second major surface of the first plurality of strands comprises a second material, wherein the first major surface of the second plurality of strands comprises a third material, wherein the second major surface of the second plurality of strands comprises a fourth material, wherein there is a fifth material disposed between the first and second materials, wherein there is a sixth material disposed between the third and fourth materials, wherein the first and fifth materials are different, wherein the first, second, third, and fourth are the same, and wherein the first material does not extend to the second major surface of the first plurality of strands. In some embodiments, the third material does not extend to the second major surface of the second plurality of strands. In some embodiments, the first and sixth materials are the same. In some embodiments, the fifth and sixth materials are the same.

In another aspect, the present disclosure describes a method of making nettings described herein, the method comprising:

providing an extrusion die comprising a plurality of shims positioned adjacent to one another, the shims together defining at least a first cavity, a second cavity, and a dispensing surface, wherein the dispensing surface has a first array of dispensing orifices alternating with a second array of dispensing orifices, wherein at least the first dispensing orifices are defined by an array of first vestibules, and wherein the plurality of shims comprises a plurality of a repeating sequence of shims, wherein the repeating sequence comprises: shims that provide a fluid passageway between the first cavity and one of the first vestibules, shims that provide a second passageway extending from the second cavity to the same vestibule, such that the area where the second fluid passageway enters the first vestibules is below the area where the first fluid passageway enters the first vestibules; and dispensing first polymeric strands from the first dispensing orifices at a first strand speed while simultaneously dispensing second polymeric strands from the second dispensing orifices at a second strand speed, wherein one of the strand speeds is at least 2 (in some embodiments, in a range from 2 to 6, or even 2 to 4) times the other strand speed to provide the netting. In some embodiments, the extrusion die further comprises a third passageway extending from a cavity to the first vestibule, such that the area where the second fluid passageway enters the first vestibule is above the area where the third fluid passageway enters the first vestibule. In some embodiments, each of the second dispensing orifices are defined by a second vestibule, and wherein each second vestibule has at least two passageways extending from it each to a different cavity, such that the area where one of those passageways enters the second vestibule is above the area where the other of those passageways enters the second vestibule.

In another aspect, the present disclosure describes a first extrusion die having at least first and second cavities, a first passageway extending from the first cavity into a first vestibule defining a first dispensing orifice, and a second passageway extending from the second cavity to the vestibule, such that the area where the first fluid passageway enters the vestibule is above the area where the second fluid passageway enters the vestibule. In some embodiments, the extrusion die further comprises a third passageway extending from a cavity to the first vestibule, such that the area where the second fluid passageway enters the first vestibule is above the area where the third fluid passageway enters the first vestibule. In some embodiments, the extrusion die comprises a plurality of first vestibules, together defining a first dispensing array, and further comprises a plurality of second dispensing orifices, together defining a second dispensing array alternating along a dispensing surface with the first dispensing array, each of the second dispensing orifices having at least one passageway extending to a cavity, wherein in some embodiments, the second dispensing orifices are defined by a second vestibule, and each second vestibule has at least two passageways extending from it each to a different cavity, such that the area where one of those passageways enters the second vestibule is above the area where the other of those passageways enters the second vestibule.

In another aspect, the present disclosure describes a second extrusion die comprising a plurality of shims positioned adjacent to one another, the shims together defining at least a first cavity, a second cavity, and a dispensing surface, wherein the dispensing surface has an array of dispensing orifices defined by an array of vestibules, wherein the plurality of shims comprises a plurality of a repeating sequence of shims, wherein the repeating sequence comprises: shims that provide a fluid passageway between the first cavity and one of the vestibules, shims that provide a second passageway extending from the second cavity to the same vestibule, such that the area where the second fluid passageway enters the vestibule is below the area where the first fluid passageway enters the vestibule. In some embodiments, the second fluid passageway is diverted into branches that meet the first fluid passageway at areas above and below the first fluid passageways at the point where the second fluid passageway enters the vestibule.

In some embodiments, the extrusion die further comprises a third passageway extending from a cavity to the first vestibule, such that the area where the second fluid passageway enters the first vestibule is above the area where the third fluid passageway enters the first vestibule. In some embodiments, the extrusion die comprises a plurality of first vestibules, together defining a first dispensing array, and further comprises a plurality of second dispensing orifices, together defining a second dispensing array alternating along a dispensing surface with the first dispensing array, each of the second dispensing orifices having at least one passageway extending to a cavity, wherein in some embodiments, the second dispensing orifices are defined by a second vestibule, and each second vestibule has at least two passageways extending from it each to a different cavity, such that the area where one of those passageways enters the second vestibule is above the area where the other of those passageways enters the second vestibule.

The term "different" in terms of polymeric materials means at least one of (a) a difference of at least 2% in at least one infrared peak, (b) a difference of at least 2% in at least one nuclear magnetic resonance peak, (c) a difference of at least 2% in the number average molecular weight, or (d) a difference of at least 5% in polydispersity. Examples of differences in polymeric materials that can provide the difference between polymeric materials include composition, microstructure, color, and refractive index.

The term "same" in terms of polymeric materials means not different.

Nettings described herein have a variety of uses, including wound care and other medical applications (e.g., elastic bandage-like material, surface layer for surgical drapes and gowns, and cast padding), tapes (including for medical applications), filtration, absorbent articles (e.g., diapers and feminine hygiene products) (e.g., as a layer(s) within the articles and/or as part of an attachment system for the articles), pest control articles (e.g., mosquito nettings), geotextile applications (e.g., erosion control textiles), water/vapor management in clothing, reinforcement for nonwoven articles (e.g., paper towels), self bulking articles (e.g., for packaging) where the netting thickness is increased by stretching nettings with first strands have average first yield strength, and wherein the second strands have an average second yield strength that is different (e.g., at least 10 percent different) than the first yield strength, floor coverings (e.g., rugs and temporary mats), grip supports for tools, athletic articles, elastic articles, and pattern coated adhesives.

BRIEF DESCRIPTION OF THE DRAWINGS

FIG. 3 is a plan view of an exemplary shim suited to form a repeating sequence of shims capable of forming a netting having optionally two different types of strands where at least one strand has optionally two different materials in a three layered arrangement;

FIG. 3A is a detail view of the section referenced as "detail 3A" in FIG. 3;

FIG. 4 is a plan view of another exemplary shim suited to form a repeating sequence of shims capable of forming a netting having two different types of strands each of optionally two different materials in a three layered arrangement;

FIG. 4A is a detail view of the section referenced as "detail 4A" in FIG. 4;

FIG. 5 is a plan view of another exemplary shim suited to form a repeating sequence of shims capable of forming a netting having two different types of strands each of optionally two different materials in a three layered arrangement;

FIG. 5A is a detail view of the section referenced as "detail 5A" in FIG. 5;

FIG. 6 is a plan view of another exemplary shim suited to form a repeating sequence of shims capable of forming a netting having two different types of strands each of optionally two different materials in a three layered arrangement;

FIG. 7 is a plan view of another exemplary shim suited to form a repeating sequence of shims capable of forming a netting having two different types of strands each of optionally two different materials in a three layered arrangement;

FIG. 7A is a detail view of the section referenced as "detail 7A" in FIG. 7;

FIG. 8 is a plan view of another exemplary shim suited to form a repeating sequence of shims capable of forming a netting having two different types of strands each of optionally two different materials in a three layered arrangement;

FIG. 8A is a detail view of the section referenced as "detail 8A" in FIG. 8;

FIG. 9 is a plan view of another exemplary shim suited to form a repeating sequence of shims capable of forming a netting having two different types of strands each of optionally two different materials in a three layered arrangement;

FIG. 9A is a detail view of the section referenced as "detail 9A" in FIG. 9;

DETAILED DESCRIPTION

Figure 1:
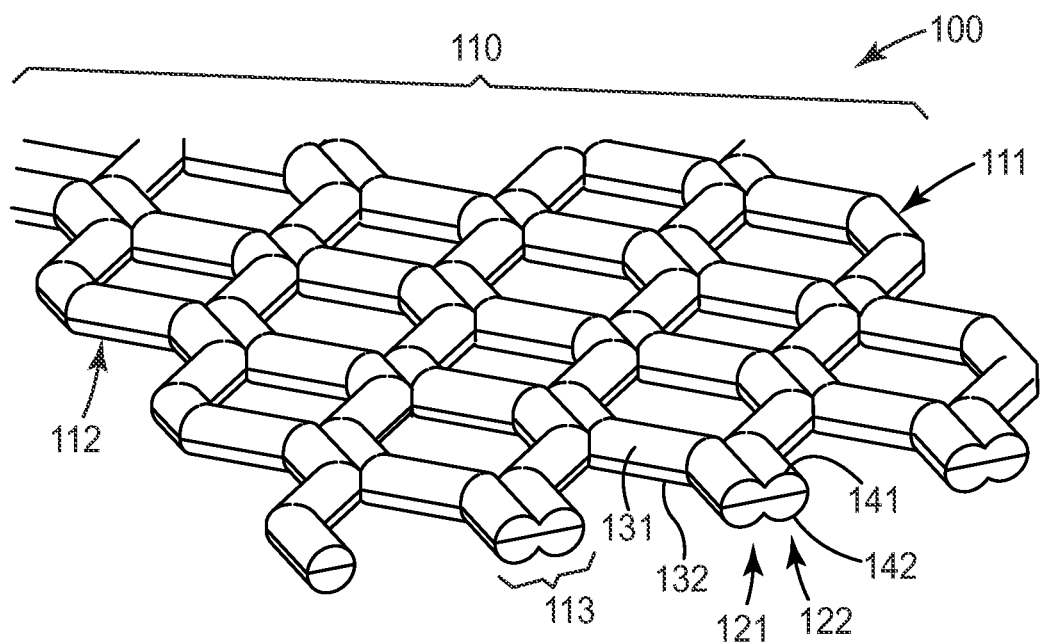
FIGS. 1 and 2 are perspective views of exemplary nettings described herein.

Referring to FIG. 1 exemplary first netting 100 described herein has array of polymeric strands 110 periodically joined together at bond regions 113 throughout array 110. Netting 100 has first and second, generally opposed major surfaces 111, 112. Bond regions 113 are generally perpendicular to first and second major surfaces 111, 112. Array 110 has first plurality of strands 121 having first and second, generally opposed major surfaces 131, 132. Array 110 has a second plurality of strands 122 having first and second, generally opposed major surfaces 141, 142. First major surface 111 comprises the first major surfaces of the first and second plurality of strands 131, 141. Second major surface 112 comprises second major surfaces 132, 142 of first and second plurality of strands 121, 122. First major surface 131 of first plurality of strands 121 comprises a first material. Second major surface 132 of first plurality of strands 121 comprises a second material. First major surface 141 of second plurality of strands 122 comprises a third material. Second major surface 142 of second plurality of strands 122 comprises a fourth material. The first and second materials are different, and the first material does not extend to second major surface 132 of first plurality of strands 121. Optionally, the third material does not extend to second major surface 142 of second plurality of strands 122.

Figure 2:
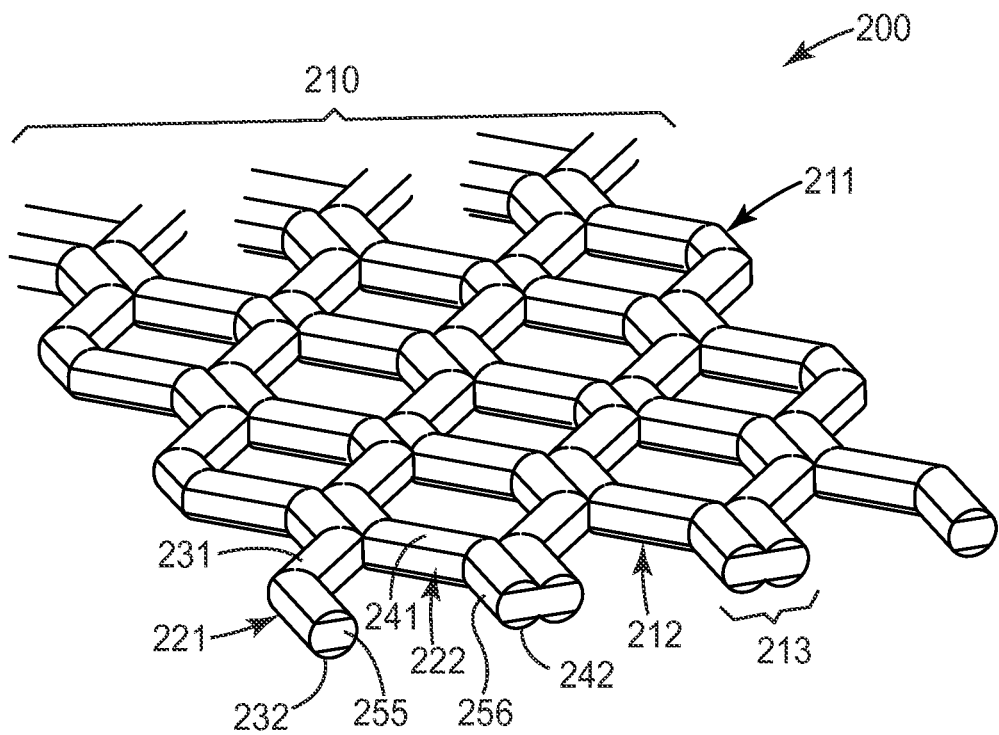

Referring to FIG. 2 exemplary second netting 200 described herein has array of polymeric strands 210 periodically joined together at bond regions 213 throughout array 210. Netting 200 has first and second, generally opposed major surfaces 211, 212. Bond regions 213 are generally perpendicular to first and second major surfaces 211, 212. Array 210 has first plurality of strands 221 having first and second, generally opposed major surfaces 231, 232. Array 210 has a second plurality of strands 222 having first and second, generally opposed major surfaces 241, 242. First major surface 211 comprises the first major surfaces of the first and second plurality of strands 231, 241. Second major surface 212 comprises second major surfaces 232, 242 of first and second plurality of strands 221, 222. First major surface 231 of first plurality of strands 221 comprises a first material. Second major surface 232 of first plurality of strands 221 comprises a second material. First major surface 241 of second plurality of strands 222 comprises a third material. Second major surface 242 of second plurality of strands 222 comprises a fourth material. A fifth material 255 is disposed between the first and second materials. A sixth material 256 is disposed between the first and second materials. The first and fifth materials are different, the first, second, third, and fourth are the same, and the first material does not extend to second major surface 232 of first plurality of strands 221. Optionally, the third material does not extend to second major surface 242 of second plurality of strands 222.

In some embodiments, the plurality of shims comprises a plurality of at least one repeating sequence of shims that includes shims that provide a passageway between a first and second cavity and the first dispensing orifices. In some of these embodiments, there will be additional shims that provide a passageway between the first and/or the second cavity, and/or a third (or more) cavity and second dispensing orifices. Typically, not all of the shims of dies described herein have passageways, as some may be spacer shims that provide no passageway between any cavity and a dispensing orifice. In some embodiments, there is a repeating sequence that further comprises at least one spacer shim. The number of shims providing passageway to the first dispensing orifices may be equal or unequal to the number of shims providing a passageway to the second dispensing orifices.

In some embodiments, the first dispensing orifices and the second dispensing orifices are collinear. In some embodiments, the first dispensing orifices are collinear, and the second dispensing orifices are also collinear but offset from and not collinear with the first dispensing orifices.

In some embodiments, extrusion dies described herein include a pair of end blocks for supporting the plurality of shims. In these embodiments it may be convenient for one or all of the shims to each have one or more through-holes for the passage of connectors between the pair of end blocks. Bolts disposed within such through-holes are one convenient approach for assembling the shims to the end blocks, although the ordinary artisan may perceive other alternatives for assembling the extrusion die. In some embodiments, the at least one end block has an inlet port for introduction of fluid material into one or both of the cavities.

In some embodiments, the shims will be assembled according to a plan that provides a repeating sequence of shims of diverse types. The repeating sequence can have diverse numbers of shims per repeat. For example, referring to FIG. 10 (and FIG. 11, which is a more detailed view of FIG. 10), a sixteen-shim repeating sequence is shown which can be used with molten polymer to form a netting with a three layered strands alternating with each other.

Exemplary passageway cross-sectional shapes include square and rectangular shapes. The shape of the passageways within, for example, a repeating sequence of shims, may be identical or different. For example, in some embodiments, the shims that provide a passageway between the first cavity and a first dispensing orifice might have a flow restriction compared to the shims that provide a conduit between the second cavity and a second dispensing orifice. The width of the dispensing orifice within, for example, a repeating sequence of shims, may be identical or different.

Figure 17:
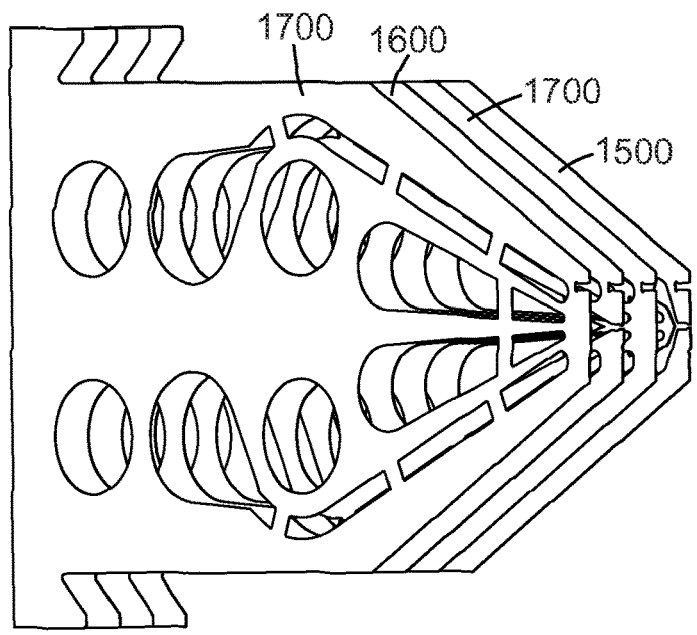
FIG. 17 is an exploded perspective view of a single instance of a repeating sequence of shims suitable for forming the netting of FIG. 1.
Figure 17A:
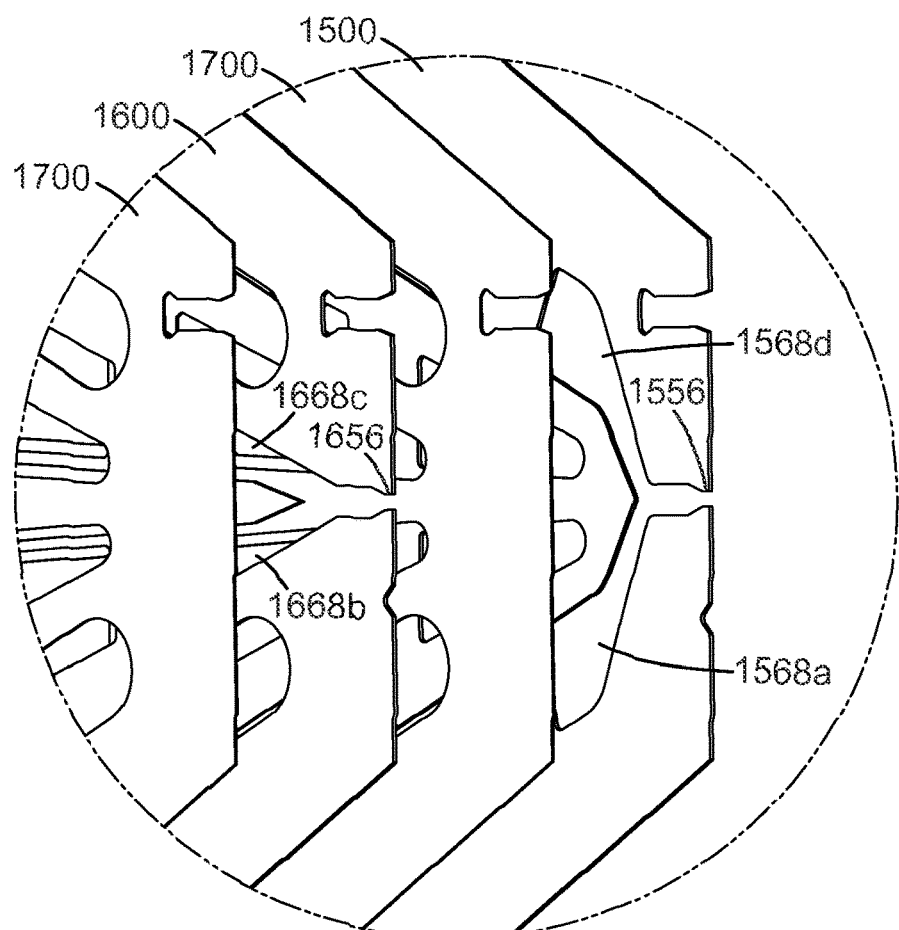
FIG. 17A is a detail view of the repeating sequence of shims of FIG. 17 emphasizing the dispensing surfaces.

Passageways from two cavities can meet together in a "Y" shape to form a two-layered strand (e.g., shims 1500 and 1600 in FIG. 17A. Additional cavities can be used to create layered strands of more than two layers by joining the passageways at the vestibule in a top down configuration. It may be desired to ratio the passageway opening to that of the desired layer ratio of the resultant strand. For example, a strand with a small top layer would have a die designed with a relatively narrow passageway for the top cavity merging with a wide passageway for the bottom cavity. In some embodiments, three or more layers are present where two or more layers are the same material, and it may be desirable to use one cavity for the layers that are the same. A passageway can be created from a set of spacer shims (e.g., shims 400 and 800 in FIG. 10) to provide a passage within a vestibule (e.g., vestibule 1101 in FIG. 10). Into such a passageway, on each side of the vestibule, a furcated terminus (e.g., 364a in FIG. 3A) can feed into the vestibule from the side, and within the spacer shims, to provide one or more layers of the same material. In some embodiments, polymer for the top and bottom layers (as shown) of a three-layer construction from one side only may create a layer of varying thickness across the strand.

In some embodiments, the assembled shims (conveniently bolted between the end blocks) further comprise a manifold body for supporting the shims. The manifold body has at least one (or more (e.g., two, three, four, or more)) manifold therein, the manifold having an outlet. An expansion seal (e.g., made of copper or alloys thereof) is disposed so as to seal the manifold body and the shims, such that the expansion seal defines a portion of at least one of the cavities (in some embodiments, a portion of both the first and second cavities), and such that the expansion seal allows a conduit between the manifold and the cavity.

In some embodiments, with respect to extrusion dies described herein, each of the dispensing orifices of the first and the second arrays have a width, and each of the dispensing orifices of the first and the second arrays are separated by up to two times the width of the respective dispensing orifice.

Typically, the passageway between cavity and dispensing orifice is up to 5 mm in length. Sometimes the first array of fluid passageways has greater fluid restriction than the second array of fluid passageways.

In some embodiments, for extrusion dies described herein, each of the dispensing orifices of the first and the second arrays have a cross sectional area, and each of the dispensing orifices of the first arrays has an area different than that of the second array.

Typically, the spacing between orifices is up to two times the width of the orifice. The spacing between orifices is greater than the resultant diameter of the strand after extrusion. This diameter is commonly called die swell. This spacing between orifices is greater than the resultant diameter of the strand after extrusion leads to the strands repeatedly colliding with each other to form the repeating bonds of the netting. If the spacing between orifices is too great the strands will not collide with each other and will not form the netting.

The shims for dies described herein typically have thicknesses in the range from 50 micrometers to 125 micrometers, although thicknesses outside of this range may also be useful. Typically, the fluid passageways have thicknesses in a range from 50 micrometers to 750 micrometers, and lengths less than 5 mm (with generally a preference for smaller lengths for decreasingly smaller passageway thicknesses), although thicknesses and lengths outside of these ranges may also be useful. For large diameter fluid passageways several smaller thickness shims may be stacked together, or single shims of the desired passageway width may be used.

The shims are tightly compressed to prevent gaps between the shims and polymer leakage. For example, 12 mm (0.5 inch) diameter bolts are typically used and tightened, at the extrusion temperature, to their recommended torque rating. Also, the shims are aligned to provide uniform extrusion out the extrusion orifice, as misalignment can lead to strands extruding at an angle out of the die which inhibits desired bonding of the net. To aid in alignment, an alignment key can be cut into the shims. Also, a vibrating table can be useful to provide a smooth surface alignment of the extrusion tip.

The size (same or different) of the strands can be adjusted, for example, by the composition of the extruded polymers, velocity of the extruded strands, and/or the orifice design (e.g., cross sectional area (e.g., height and/or width of the orifices)). For example, a first polymer orifice that is three times greater in area than the second polymer orifice can generate a netting with equal strand sizes while meeting the velocity difference between adjacent strands.

In general, it has been observed that the rate of strand bonding is proportional to the extrusion speed of the faster strand. Further, it has been observed that this bonding rate can be increased, for example, by increasing the polymer flow rate for a given orifice size, or by decreasing the orifice area for a given polymer flow rate. It has also been observed that the distance between bonds (i.e., strand pitch) is inversely proportional to the rate of strand bonding, and proportional to the speed that the netting is drawn away from the die. Thus, it is believed that the bond pitch and the netting basis weight can be independently controlled by design of the orifice cross sectional area, the takeaway speed, and the extrusion rate of the polymer. For example, relatively high basis weight nettings, with a relatively short bond pitch can be made by extruding at a relatively high polymer flow rate, with a relatively low netting takeaway speed, using a die with a relatively small strand orifice area. Additional general details for adjusting the relative speed of strands during net formation can be found, for example, in PCT Pub. No. WO 2013/028654 (Ausen et al.), published Feb. 28, 2013, the disclosure of which is incorporated herein by reference.

Typically, the polymeric strands are extruded in the direction of gravity. This facilitates collinear strands to collide with each other before becoming out of alignment with each other. In some embodiments, it is desirable to extrude the strands horizontally, especially when the extrusion orifices of the first and second polymer are not collinear with each other.

In practicing methods described herein, the polymeric materials might be solidified simply by cooling. This can be conveniently accomplished passively by ambient air, or actively by, for example, quenching the extruded polymeric materials on a chilled surface (e.g., a chilled roll). In some embodiments, the polymeric materials are low molecular weight polymers that need to be cross-linked to be solidified, which can be done, for example, by electromagnetic or particle radiation. In some embodiments, it is desirable to maximize the time to quenching to increase the bond strength.

Optionally, it may be desirable to stretch the as-made netting. Stretching may orientate the strands, and has been observed to increase the tensile strength properties of the netting. Stretching may also reduce the overall strand size, which may be desirable for applications which benefit from a relatively low basis weight. As an additional example, if the materials and the degree of stretch, are chosen appropriately, the stretch can cause some of the strands to yield while others do not, tending to form loft (e.g., the loft may be created because of the length difference between adjacent bonded netting strands or by curling of the bonds due to the yield properties of the strands forming the bond). As an additional example, if the materials and the degree of stretch, are chosen correctly, the stretch can cause some of the top layers to yield while the bottom layers do not, tending to form loft (the loft may be created because of the length of the top and bottom layers has become different.) The attribute can be useful for packaging applications where the material can be shipped to package assembly in a relatively dense form, and then lofted, on location. The loftiness attribute can also be useful as the loop for hook and loop attachment systems, wherein the loft created with strands provides hook attachment to the netting strands. As a second additional example, if the materials of the first and second sets of strands are of different strength, cross-machine direction stretching can cause one strand to stretch and the second set of strand to not stretch. This can be useful to create for example, elastic strands which provide machine direction elasticity, which are connected to small, oriented strands, which purpose is to hold the elastic strands in place. In some embodiments, netting could be made with cross-direction elasticity with relatively small strands that are elastic, connected to relatively large strands that are inelastic.

Figure 11:
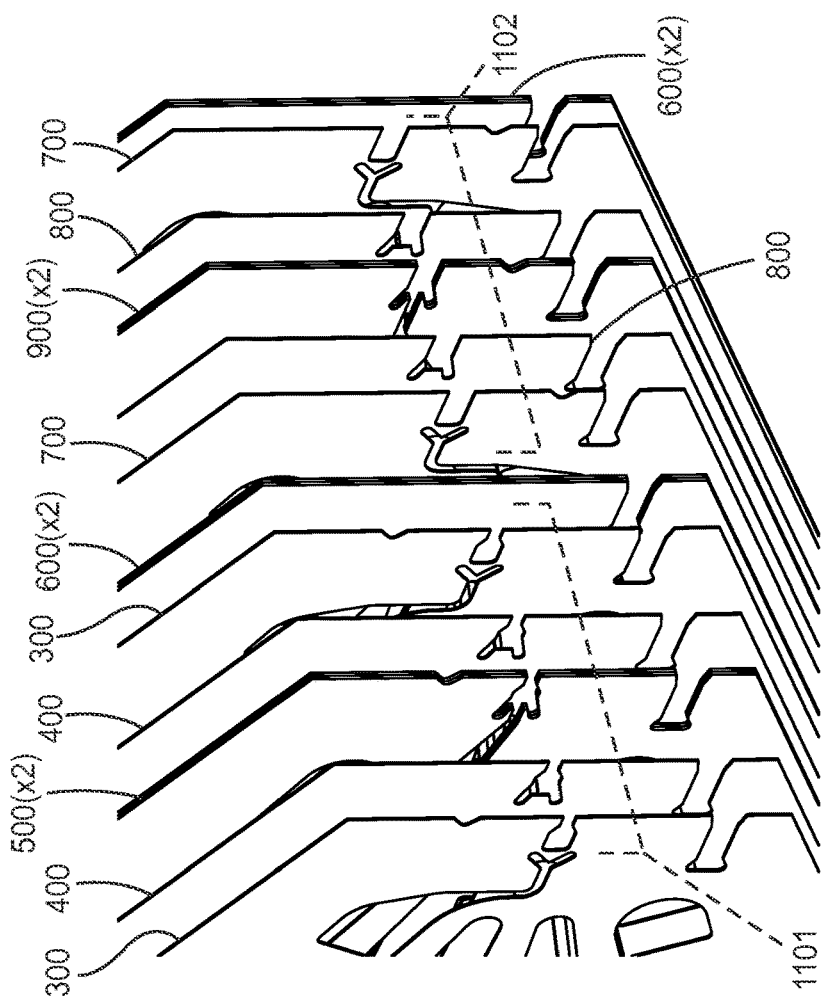
FIG. 11 is a detail view of the repeating sequence of shims of FIG. 10 emphasizing the dispensing surfaces.
Figure 10:
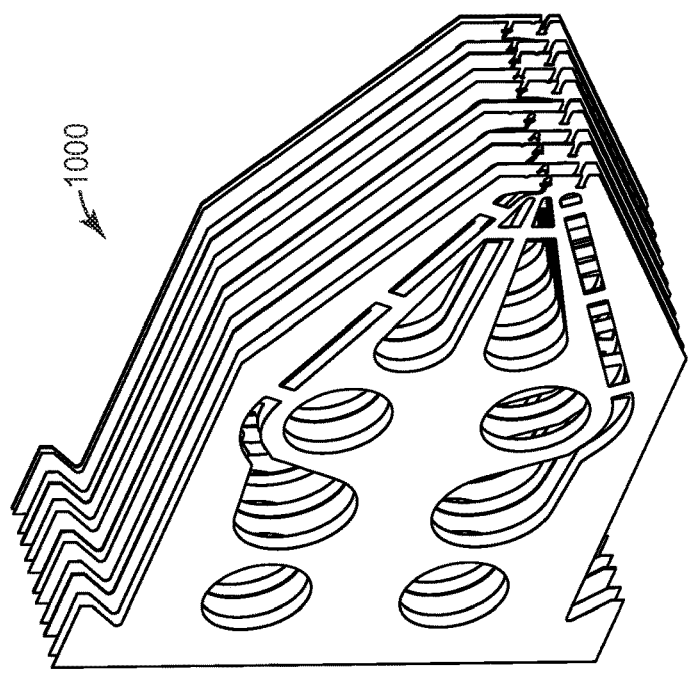
FIG. 10 is an exploded perspective view of a single instance of a repeating sequence of shims suitable to form the netting of FIG. 2.
Figure 12:
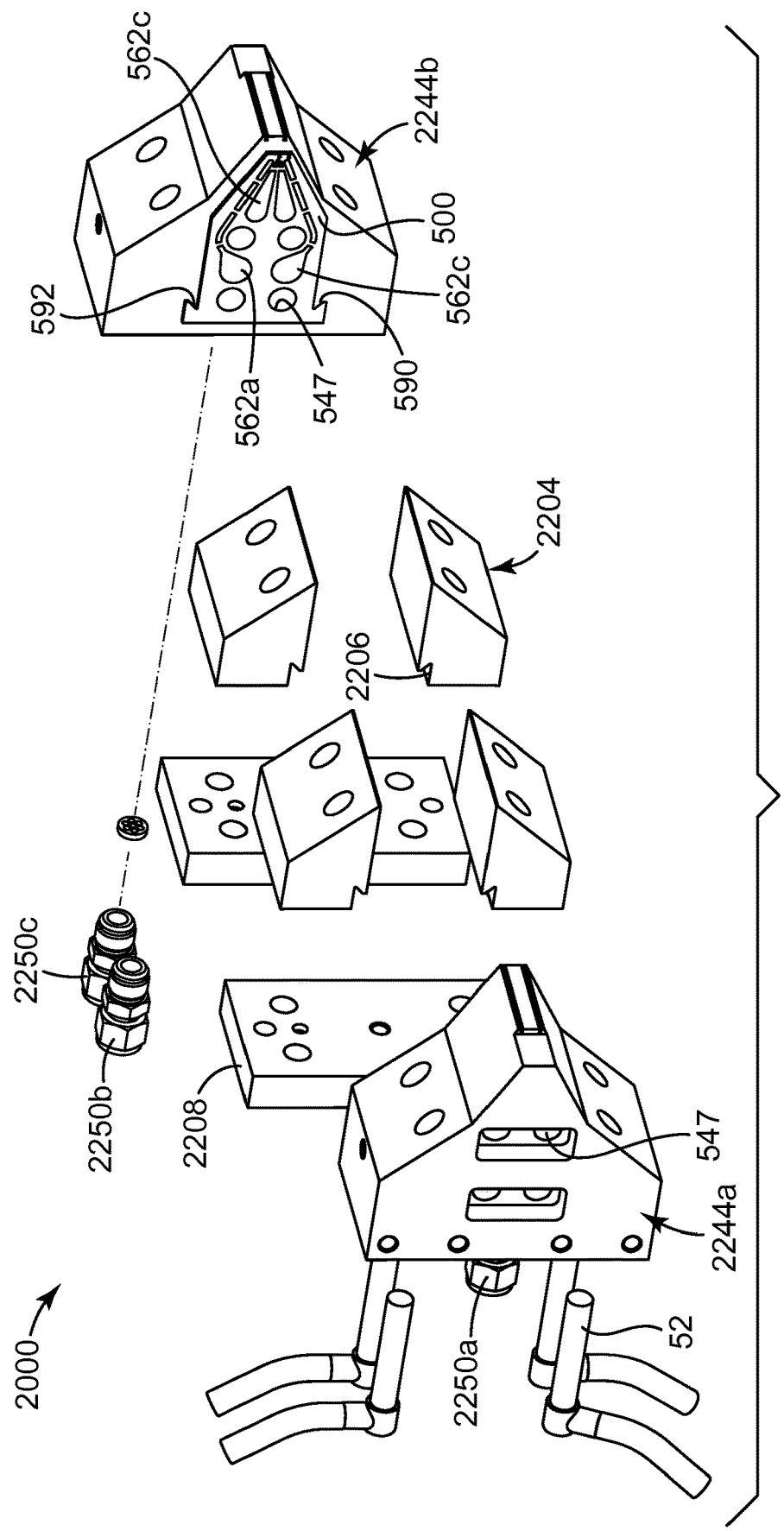
FIG. 12 is an exploded perspective view of an exemplary mount suitable for an extrusion die composed of multiple repeats of the repeating sequence of shims of FIG. 10.
Figure 13:
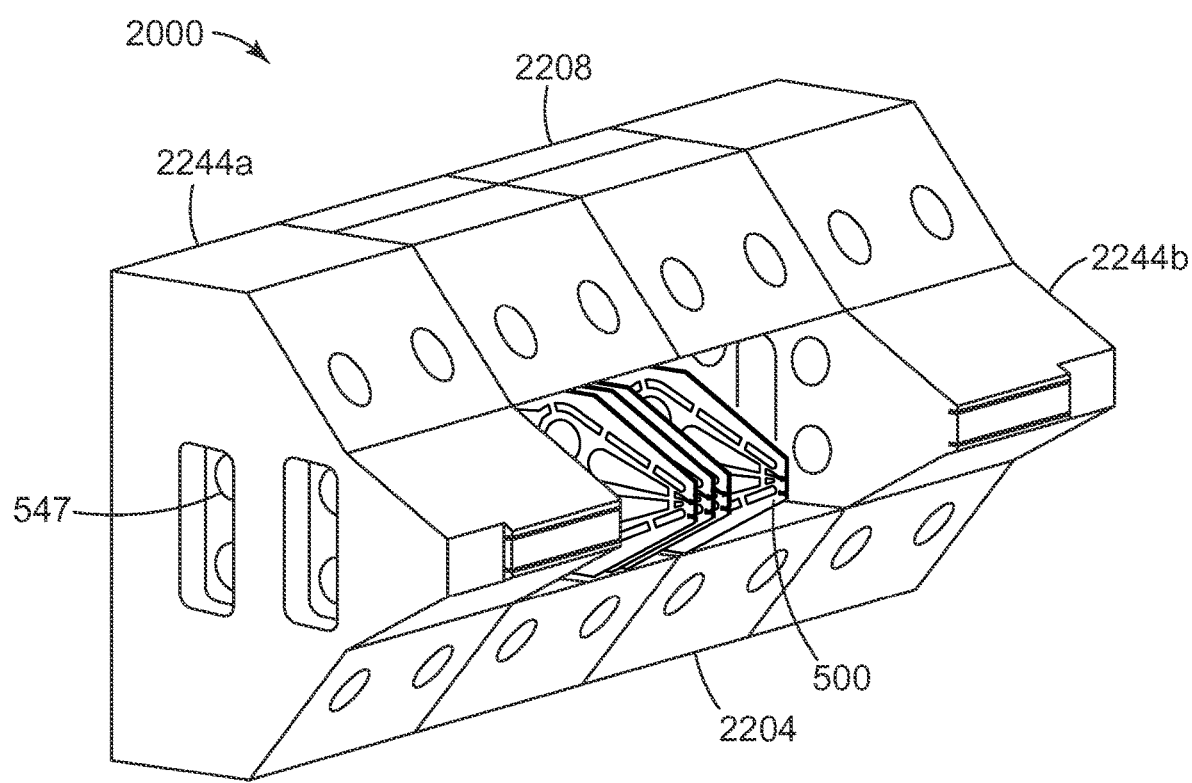
FIG. 13 is a perspective view of the mount of FIG. 12 in an assembled state.

Dies and methods described herein can be used to form netting where polymeric strands are formed of two different materials in a layered arrangement. FIGS. 3-9 illustrate exemplary shims useful for assembling an extrusion die capable of producing a netting where both of the strands are of a layered, of optionally different materials. FIG. 10 is an exploded perspective assembly illustration of an exemplary repeating sequence employing those shims. FIG. 11 is a detail perspective view of the exemplary dispensing surface associated with the repeating sequence of FIG. 10. FIG. 12 is an exploded perspective view of a mount suitable for an extrusion die composed of multiple repeats of the repeating sequence of shims of FIG. 10. FIG. 13 shows the mount of FIG. 12 in an assembled state.

Referring now to FIG. 3, a plan view of shim 300 is illustrated. Shim 300 has first aperture 360a, second aperture 360b, third aperture 360c, and a fourth aperture 360d. When shim 300 is assembled with others as shown in FIGS. 10 and 11, aperture 360a helps define first cavity 362a, aperture 360b helps define second cavity 362b, aperture 360c helps define third cavity 362c and aperture 360d helps define fourth cavity 362d. Shim 300 has several holes 47 to allow the passage of, for example, bolts to hold shim 300 and others to be described below into an assembly. Shim 300 has dispensing surface 367, and in this particular embodiment, dispensing surface 367 has indexing groove 380 and identification notch 382. Shim 300 has shoulders 390 and 392. Shim 300 has dispensing opening 356, but it will be noted that this shim has no integral connection between dispensing opening 356 and any of cavities 362a, 362b, 362c, or 362d. There is no connection, for example, from cavity 362a to dispensing opening 356, via, for example, passageway 368a, but the flow has a route to the dispensing surface in the perpendicular-to-the-plane-of-the-drawing dimension when shim 300 is assembled with shim 400 as illustrated in assembly drawing (see FIG. 11). This facilitates material to flow all the way to point 364a. More particularly, passageway 368a has furcated terminus 364a to direct material from cavity 362a into a passageway in the adjacent shim as will be discussed below in connection with FIG. 4. Passageway 368a, furcated terminus 364a, and dispensing opening 356 may be more clearly seen in the expanded view shown in FIG. 3A.

Referring now to FIG. 4, a plan view of shim 400 is illustrated. Shim 400 has first aperture 460a, second aperture 460b, third aperture 460c, and a fourth aperture 460d. When shim 400 is assembled with others as shown in FIGS. 10 and 11, aperture 460a helps define first cavity 362a, aperture 460b helps define second cavity 362b, aperture 460c helps define third cavity 362c, and aperture 460d helps define fourth cavity 362d. Shim 400 has dispensing surface 467, and in this particular embodiment, dispensing surface 467 has indexing groove 480 and identification notch 482. Shim 400 has shoulders 490 and 492. Shim 400 has dispensing opening 456, but it will be noted that this shim has no integral connection between dispensing opening 456 and any of cavities 362a, 362b, 362c, or 362d. Rather, blind recess 494 behind dispensing openings 456 has two furcations and provides a path to allow a flow of material from the furcated terminus 364a as discussed above in connection with FIG. 3. Blind recess 494 has two furcations to direct material from passageways 368a into top and bottom layers on either side of the middle layer provided by second polymeric composition emerging from third cavity 568c. When the die is assembled as shown in FIG. 11, the material flowing into blind recess 494 will form, for example, layers 231 and 232 in strand 221 of FIG. 2. Blind recess 494 and dispensing opening 456 may be more clearly seen in the expanded view shown in detail drawing FIG. 4A.

Referring now to FIG. 5, a plan view of shim 500 is illustrated. Shim 500 has first aperture 560a, second aperture 560b, third aperture 560c, and fourth aperture 560d. When shim 500 is assembled with others as shown in FIGS. 10 and 11, aperture 560a helps define first cavity 362a, aperture 560b helps define second cavity 362b, aperture 560c helps define third cavity 362c, and aperture 560d helps define fourth cavity 362d. Shim 500 has dispensing surface 567, and in this particular embodiment, dispensing surface 567 has indexing groove 580 and an identification notch 582. Shim 500 has shoulders 590 and 592. It might seem that there is no path from cavity 362c to dispensing opening 556, via, for example, passageway 568c, but the flow has a route in the perpendicular-to-the-plane-of-the-drawing dimension when the sequence of FIGS. 10 and 11 is completely assembled. Passageway 568c includes furcations 548 that further conduct the flow of a molten polymeric composition from cavity 362*a* via furcations 494 in shim 400. When assembled and in use, molten material from cavity 362*c* flows through passageway 568*c* to form material 255 in strand 221 in FIG. 2. These structures may be more clearly seen in the detail view of FIG. 5.

Referring now to FIG. 6, a plan view of shim 600 is illustrated. Shim 600 has first aperture 660*a*, second aperture 660*b*, third aperture 660*c*, and a fourth aperture 660*d*. When shim 600 is assembled with others as shown in FIGS. 10 and 11, aperture 660*a* helps define first cavity 362*a*, aperture 660*b* helps define second cavity 362*b*, aperture 660*c* helps define third cavity 362*c*, and aperture 660*d* helps define fourth cavity 362*d*. Shim 600 has dispensing surface 667, and in this particular embodiment, dispensing surface 667 has indexing groove 680 and identification notch 682. Shim 600 has shoulders 690 and 692. There is no passage from any of the cavities to dispensing surface 667, as this shim creates a non-dispensing area along the width of the die, in actual use separating the shims producing first strand 221 from the shims producing second strand 222.

Referring now to FIG. 7, a plan view of shim 700 is illustrated. Shim 700 is a near reflection of shim 300, and has first aperture 760*a*, second aperture 760*b*, third aperture 760*c*, and a fourth aperture 760*d*. When shim 700 is assembled with others as shown in FIGS. 10 and 11, aperture 760*a* helps define first cavity 362*a*, aperture 760*b* helps define second cavity 362*b*, aperture 760*c* helps define third cavity 362*c*, and aperture 760*d* helps define fourth cavity 362*d*. Shim 700 has several holes 47 to allow the passage of, for example, bolts to hold shim 700 and others to be described below into an assembly. Shim 700 has dispensing surface 767, and in this particular embodiment, dispensing surface 767 has indexing groove 780 and an identification notch 782. Shim 700 has shoulders 790 and 792. Shim 700 has dispensing opening 756, but it will be noted that this shim has no integral connection between dispensing opening 756 and any of the cavities 362*a*, 362*b*, 362*c*, or 362*d*. There is no direct connection, for example, from cavity 362*b* to dispensing opening 756, via, for example, passageway 768*b*, but the flow has a route to the dispensing surface in the perpendicular-to-the-plane-of-the-drawing dimension when shim 700 is assembled with shim 800 as illustrated in assembly drawing FIG. 11. This facilitates material to flow all the way to point 769*b*. More particularly, passageway 768*b* has furcated terminus 769*b* to direct material from cavity 362*b* into a passageway in the adjacent shim as will be discussed below in connection with FIG. 8.

Passageway 768*b*, furcated terminus 769*b*, and dispensing opening 756 may be more clearly seen in the detail view shown in FIG. 7A. It will be observed that the shape of dispensing opening 756 is slightly different from dispensing opening 356 in FIG. 3. This illustrates that the netting described herein does not require that the first and second strands (221 and 222 in FIG. 2) be the same size.

Referring now to FIG. 8, a plan view of shim 800 is illustrated. Shim 800 is a near reflection of shim 400, and has first aperture 860*a*, second aperture 860*b*, third aperture 860*c*, and a fourth aperture 860*d*. When shim 800 is assembled with others as shown in FIGS. 10 and 11, aperture 860*a* helps define first cavity 362*a*, aperture 860*b* helps define second cavity 362*b*, aperture 860*c* helps define third cavity 362*c*, and aperture 860*d* helps define fourth cavity 362*d*. Shim 800 has dispensing surface 867, and in this particular embodiment, dispensing surface 867 has indexing groove 880 and an identification notch 882. Shim 800 has shoulders 890 and 892. Shim 800 has dispensing opening 856, but it will be noted that this shim has no integral connection between dispensing opening 856 and any of the cavities 362*a*, 362*b*, 362*c*, or 362*d*. Rather, blind recess 894 behind dispensing openings 856 has two furcations and provides a path to allow a flow of material from furcated terminus 769*b* as discussed above in connection with FIG. 7. The two furcations on blind recess 894 has direct material from passageway 768*b* into top and bottom layers on either side of the middle layer provided by the polymeric composition emerging from fourth cavity 362*d* as will be discussed with more particularity in connection with FIG. 9 below. When the die is assembled as shown in FIG. 11, the material flowing into blind recess 894 will form, for example, layers 241 and 242 in strand 222 (see FIG. 2). Blind recess 894 and dispensing opening 856 may be more clearly seen in the expanded view shown in detail drawing FIG. 8A. Analogous from the observation made in connection with FIG. 7A above, it will be observed that the shape of dispensing opening 856 is slightly different from dispensing opening 456 in FIG. 4. This illustrates that the netting described herein does not require that the first and second strands (221 and 222 in FIG. 2) be the same size.

Referring now to FIG. 9, a plan view of shim 900 is illustrated. Shim 900 has first aperture 960*a*, second aperture 960*b*, third aperture 960*c*, and a fourth aperture 960*d*. When shim 900 is assembled with others as shown in FIGS. 10 and 11, aperture 960*a* helps define first cavity 362*a*, aperture 960*b* helps define second cavity 362*b*, aperture 960*c* helps define third cavity 362*c*, and aperture 960*d* helps define fourth cavity 362*d*. Shim 900 has dispensing surface 967, and in this particular embodiment, dispensing surface 967 has indexing groove 980 and an identification notch 982. Shim 900 has shoulders 990 and 992. It might seem that there is no path from cavity 362*d* to dispensing opening 556, via, for example, passageway 968*d*, but the flow has a route in the perpendicular-to-the-plane-of-the-drawing dimension when the sequence of FIGS. 10 and 11 is completely assembled. Passageway 968*d* includes furcations 994 that further conduct the flow of a molten polymeric composition from cavity 362*b* via the furcations 894 in shim 800. When assembled and in use, molten material from cavity 362*d* flows through passageway 968*d* to form material 256 in strand 222 (see FIG. 2). These structures may be more clearly seen in the detail view of FIG. 9A.

Referring new to FIG. 10, an exploded perspective view of a single instance of a sixteen-shim repeating sequence 1000 of shims 300, 400, 500, 600, 700, 800, and 900, suitable to form, for example, netting 200 shown in FIG. 2, is illustrated. FIG. 11 is a detail view of the repeating sequence of shims 1000 of FIG. 10 emphasizing the dispensing surfaces. In FIG. 11, it can be appreciated that when shims 300, 400, and 500, are assembled together, first vestibule 1101 is formed having a dispensing orifice jointly defined by the dispensing openings of the shims. Similarly, when shims 700, 800, and 900, are assembled together, second vestibule 1102 is formed having a dispensing orifice jointly defined by the dispensing openings of those shims. It should be noted that in the depicted embodiment the area of the dispensing orifices associated with first vestibule 1101 is one half that of the dispensing orifices associated with the second vestibule 1102. This facilitates dispensing first polymeric strands from the first dispensing orifices at a first strand speed while simultaneously dispensing second polymeric strands from the second dispensing orifices at a second strand speed while keeping the total relative flowrate from the first and second vestibules 1101 and 1102 the same. Whether by making sizes of the orifices different or by varying the pressure of the molten polymer within the cavities, netting is properly formed when one of the strand speeds is at least two (in some embodiments, in a range from 2 to 6, or even 2 to 4) times the other strand speed.

Referring now to FIG. 12, an exploded perspective view of a mount 2000 suitable for an extrusion die composed of multiple repeats of sequences of shims of FIGS. 10 and 11 is illustrated. Mount 2000 is particularly adapted to use shims 300, 400, 500, 600, 700, 800, and 900 as shown in FIGS. 3-9. However for visual clarity, only a single instance of shim 500 is shown in FIG. 12. The multiple repeats of sequences of shims of FIGS. 10 and 11 are compressed between two end blocks 2244a and 2244b. Conveniently, through bolts can be used to assemble the shims to the end blocks 2244a and 2244b, passing through holes 47 in shims 300, 400, 500, 600, 700, 800, and 900.

In this embodiment, four inlet fittings 2250a, 2250b, and 2250c (and a fourth inlet fitting hidden in this view on the far side of end block 2244a) provide a flow path for four streams of molten polymer through end blocks 2244a and 2244b to cavities 362a, 362b, 362c, and 362d. Compression blocks 2204 have a notch 2206 that conveniently engages the shoulders on the shims (e.g., 390 and 392 on 300). When mount 2230 is completely assembled, compression blocks 2204 are attached by, for example, machine bolts to backplates 2208. Holes are conveniently provided in the assembly for the insertion of cartridge heaters 52.

Referring now to FIG. 13, a perspective view of mount 2000 of FIG. 12 is illustrated in a partially assembled state. A few shims (e.g., 500) are in their assembled positions to show how they fit within mount 2000, but most of the shims that would make up an assembled die have been omitted for visual clarity.

Figure 14:
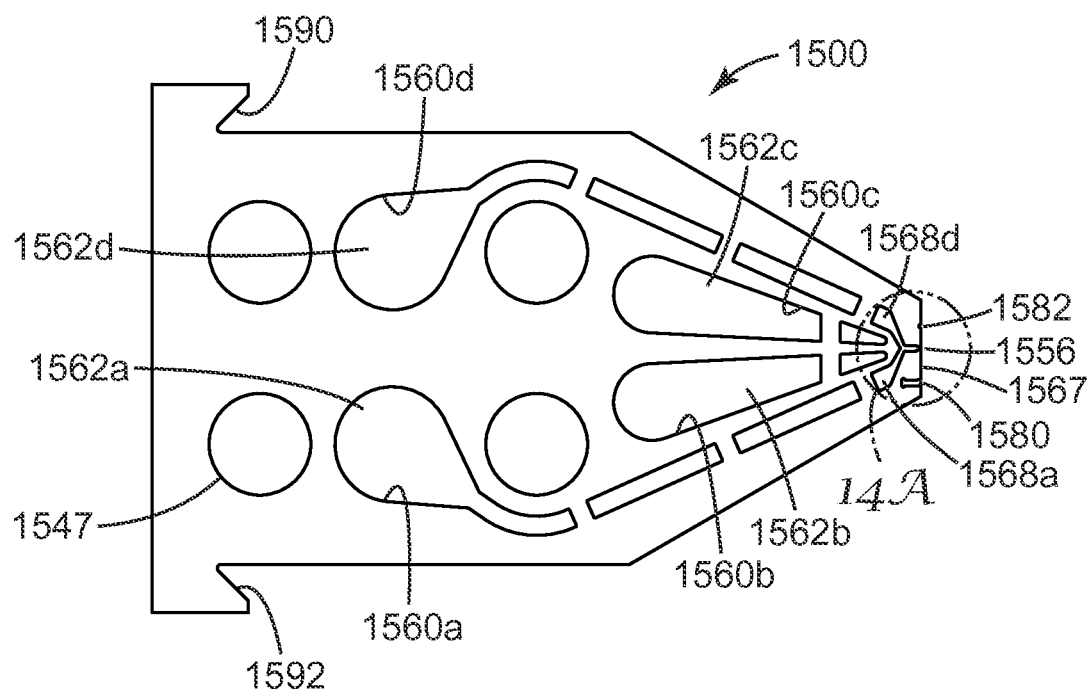
FIG. 14 is a plan view of an exemplary shim suitable for forming a repeating sequence of shims capable of forming a netting having strands each of two different materials in an over/under arrangement as generally illustrated in FIG. 1.
Figure 15:
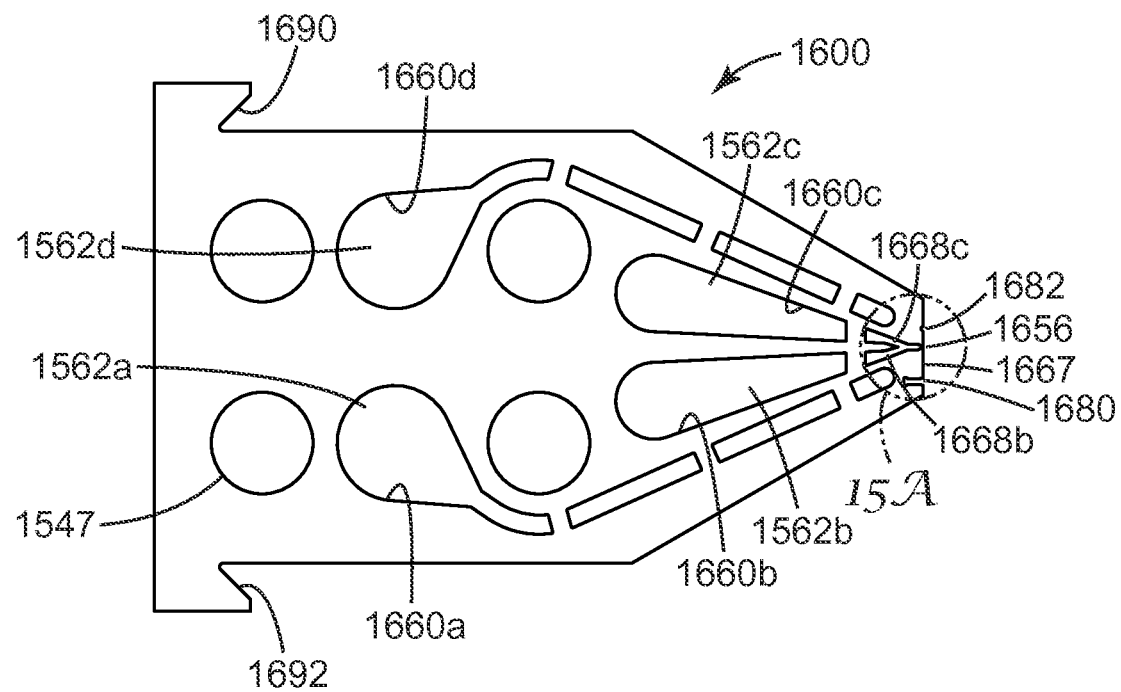
FIG. 15 is a plan view of another exemplary shim suitable for forming a repeating sequence of shims capable of forming a netting having strands each of two different materials in an over/under arrangement as generally illustrated in FIG. 1.
Figure 16:
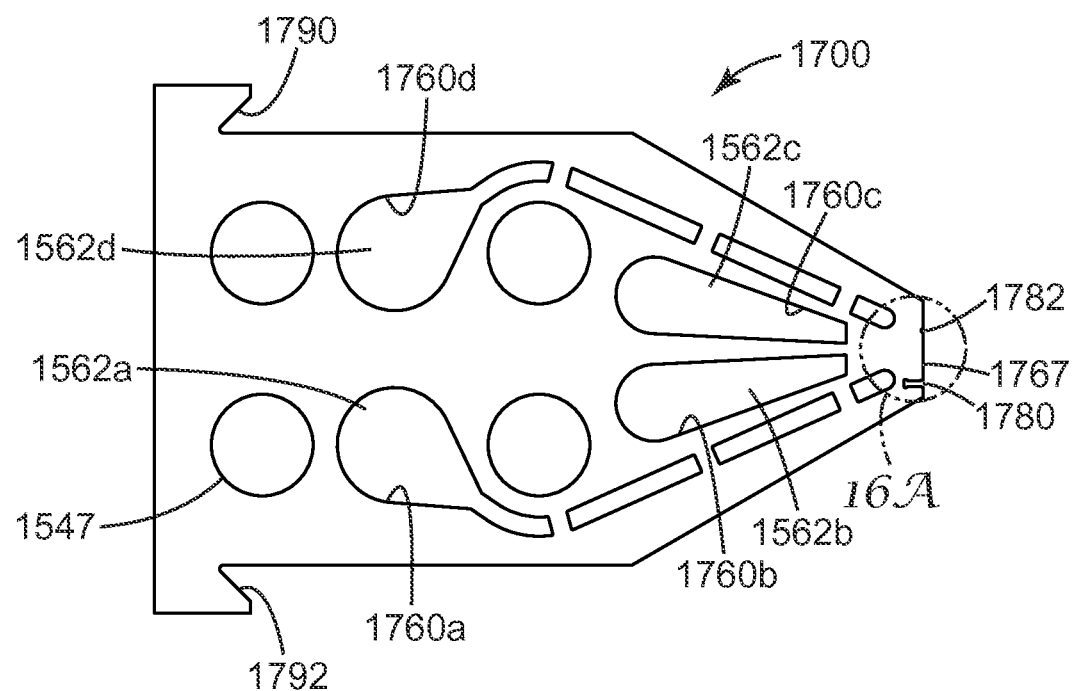
FIG. 16 is a plan view of another exemplary shim suitable for forming a repeating sequence of shims capable of forming a netting having strands each of two different materials in an over/under arrangement as generally illustrated in FIG. 1.

Another exemplary embodiment of a plurality of shims useful for an extrusion die according to the present disclosure is illustrated in FIGS. 14-17. A netting in which the strands have first and second layers (e.g., with each layer in each of the first and second segments being of a different polymeric composition), as generally depicted in FIG. 1, can conveniently be extruded from this extrusion die. Referring now to FIG. 14, a plan view of shim 1500 is illustrated. Shim 1500 is useful, for example, in a sequence of shims shown in FIGS. 17 and 17A. Other shims useful in this sequence are shown, for example, in FIGS. 15 and 16. Shim 1500 has first aperture 1560a, second aperture 1560b, third aperture 1560c, and fourth aperture 1560d. When shim 1500 is assembled with others as shown in FIGS. 17 and 17A, first aperture 1560a helps define first cavity 1562a, second aperture 1560b helps define second cavity 1562b, third aperture 1560c helps define third cavity 1562c, and fourth aperture 1560d helps define fourth cavity 1562d. As will be further discussed below, molten polymer in cavities 1562a and 1562d can be extruded in layered first strands, and molten polymer in cavities 1562b and 1562c can be extruded in layered second strands between those layered first segments, and so as to form a netting, for example, similar to the netting shown in FIG. 1 but having layered first strands as well as layered second strands.

Figure 14A:
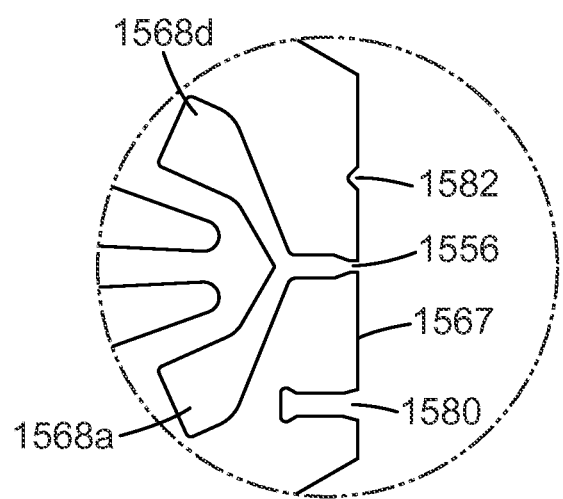
FIG. 14A is a detail view of the section referenced as "detail 14A" in FIG. 14.

Shim 1500 has several holes 1547 to allow the passage of, for example, bolts to hold shim 1500 and others to be described below into an assembly. Shim 1500 has dispensing opening 1556 in dispensing surface 1567. Dispensing opening 1556 may be more clearly seen in the expanded view shown in FIG. 14A. It might appear that there are no paths from cavities 1562a and 1562d to dispensing opening 1556, via, for example, passageways 1568a and 1568d, but the flow has a route in the perpendicular-to-the-plane-of-the-drawing dimension when the sequence of FIGS. 17 and 17A, for example, is completely assembled. In the illustrated embodiment, dispensing surface 1567 has indexing groove 1580 which can receive an appropriately shaped key to facilitate assembling diverse shims into a die. The shim may also have identification notch 1582 to help verify that the die has been assembled in the desired manner. This embodiment of the shim has shoulders 1590 and 1592, which can assist in mounting the assembled die as described above in connection with FIG. 12.

Figure 15A:
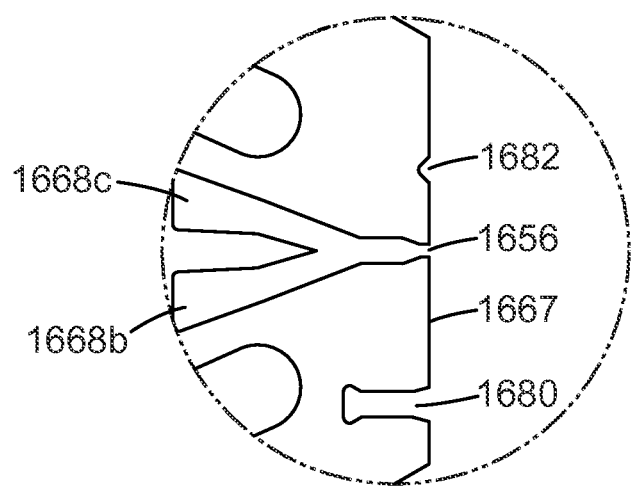
FIG. 15A is a detail view of the section referenced as "detail 15A" in FIG. 15.

Referring now to FIG. 15, a plan view of shim 1600 is illustrated. Shim 1600 has first aperture, 1660a, second aperture 1660b, third aperture 1660c, and fourth aperture 1660d. When shim 1600 is assembled with others as shown in FIGS. 15 and 15A, first aperture 1660a helps define first cavity 1562a, second aperture 1660b helps define second cavity 1562b, third aperture 1660c helps define third cavity 1562c, and fourth aperture 1660d helps define fourth cavity 1562d. Analogous to shim 1500, shim 1600 has dispensing surface 1667, and in this particular embodiment, dispensing surface 1667 has indexing groove 1680 and identification notch 1682. Also analogous to shim 1500, shim 1600 has shoulders 1690 and 1692. It might appear that there are no paths from cavities 1562b and 1562c to dispensing opening 1656, via, for example, passageway 1668b and 1668c, respectively, but the flow has a route in the perpendicular-to-the-plane-of-the-drawing dimension when the sequence of FIGS. 15 and 15A, for example, is completely assembled. Dispensing opening 1656 may be more clearly seen in the expanded view shown in FIG. 15A.

Figure 16A:
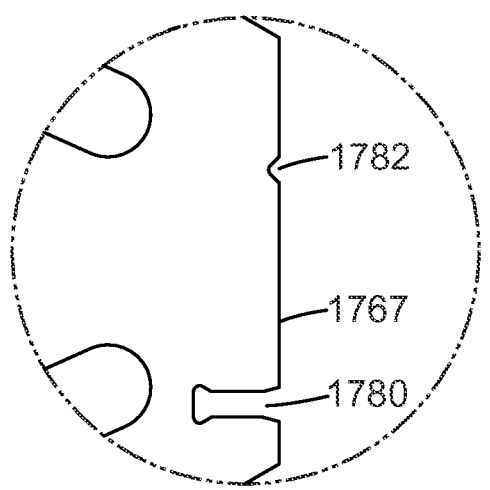
FIG. 16A is a detail view of the section referenced as "detail 16A" in FIG. 16.

Referring now to FIG. 16, a plan view of shim 1700 is illustrated. Shim 1700 has first aperture 1760a, second aperture 1760b, third aperture 1760c, and fourth aperture 1760d. When shim 1700 is assembled with others as shown in FIGS. 16 and 16A, first aperture 1760a helps define first cavity 1562a, second aperture 1760b helps define second cavity 1562b, third aperture 1760c helps define third cavity 1562c, and fourth aperture 1760d helps define fourth cavity 1562d. Analogous to shim 1500, shim 1700 has dispensing surface 1767, and in this particular embodiment, dispensing surface 1767 has indexing groove 1780. Also analogous to shim 1500, shim 1700 has shoulders 1790 and 1792. However, shim 1600 has no dispensing opening, but rather serves to separate the flows from dispensing orifices 1556 and 1656 (see FIGS. 14 and 15) so that separate strands 121 and 122 (see FIG. 1) will be formed. The dispensing surface 1767 and its associated features may be more clearly seen in the expanded view shown in FIG. 16A.

Referring now to FIG. 17, a perspective assembly drawing of a sequence of shims employing the shims of FIGS. 14-16 so as to produce layered first and second segments is shown. Shims 1500 and 1600 are separated by shims 1700 to produce separate layered first and second strands. More particularly, proceeding from left to right in FIGS. 17 and 17A, one or more instances of shim 1700 and one or more instances of a shim 1600 serve to create, for example, strand 121 (see FIG. 1), and one or more instances of shim 1700 and one or more instances of shim 1500 serve to create, for example, strand 122 (see FIG. 1). More than one of each of shims 1600 and 1500 may be used together in a sequence depending on the thickness of the shims and the desired width of the layered first and second strands. For example, one or more instances of shim 1700 can be followed by a number of shims 1600, and one or more instances of shim 1700 can be followed by the same or different number of shims 1500. When assembled as shown in FIG. 17A the dispensing openings 1556 and 1656 in shims 1500 and 1600, respectively, define dispensing openings having a vestibules behind them. And when multiple instances of the depicted repeating sequence of shims are assembled into a die, a first and as second array of dispensing orifices is this formed.

Modifications of the shims shown in FIGS. 3-11 and 14-17 can be useful for making other embodiments of netting according to the present disclosure. For example, the shims shown in FIGS. 3-11 can be modified to have only two cavities, and first passageways 568a and third passageways 868c can be modified to extend from the same cavity. With this modification, netting having first and second strands 221 and 222 as depicted in FIG. 2, where the first strand 221 and second strand 222 have layers of identical composition can be made. In other embodiments, the shims shown in FIGS. 3-11 can be modified to provide first and/or second strands that have four, five, or even more layers. In planning and using such modifications, it remains necessary to arrange for the differential between the first and second speed speeds, either with restrictions in the passageways, restrictions in the dispensing orifices, or control of the flowrate of polymer via the pressure in the cavities.

For some purposes, it might be convenient to laminate the netting of, for example, FIG. 2 to a substrate such as a film or a non-woven fabric to form a composite article. Continuous or periodic bonds can be formed by adhesives, heat or ultrasonic welding, the latter can be accomplished, for example, with a sonic bonder such as that available under the trade designation "0 MHZ BRANSON 2000AED" from Branson Ultrasonics Corporation, Danbury, Conn. Alternatively, one or more of the major surfaces of the netting may itself be a pressure sensitive adhesive polymer which is used to bond the netting to a substrate.

Portions of the exteriors of the first and second strands bond together at the bond regions. In methods described herein for making nettings described herein, the bonding occurs in a relatively short period of time (typically less than 1 second). The bond regions, as well as the strands typically cool through air and natural convection and/or radiation. In selecting polymers for the strands, in some embodiments, it may be desirable to select polymers of bonding strands that have dipole interactions (or H-bonds) or covalent bonds. Bonding between strands has been observed to be improved by increasing the time that the strands are molten to enable more interaction between polymers. Bonding of polymers has generally been observed to be improved by reducing the molecular weight of at least one polymer and or introducing an additional co-monomer to improve polymer interaction and/or reduce the rate or amount of crystallization. In some embodiments, the bond strength is greater than the strength of the strands forming the bond. In some embodiments, it may be desirable for the bonds to break and thus the bonds will be weaker than the strands.

Suitable polymeric materials for extrusion from dies described herein, methods described herein, and for nettings described herein include thermoplastic resins comprising polyolefins (e.g., polypropylene and polyethylene), polyvinyl chloride, polystyrene, nylons, polyesters (e.g., polyethylene terephthalate) and copolymers and blends thereof. Suitable polymeric materials for extrusion from dies described herein, methods described herein, and for composite layers described herein also include elastomeric materials (e.g., ABA block copolymers, polyurethanes, polyolefin elastomers, polyurethane elastomers, metallocene polyolefin elastomers, polyamide elastomers, ethylene vinyl acetate elastomers, and polyester elastomers). Exemplary adhesives for extrusion from dies described herein, methods described herein, and for composite layers described herein include acrylate copolymer pressure sensitive adhesives, rubber based adhesives (e.g., those based on natural rubber, polyisobutylene, polybutadiene, butyl rubbers, styrene block copolymer rubbers, etc.), adhesives based on silicone polyureas or silicone polyoxamides, polyurethane type adhesives, and poly(vinyl ethyl ether), and copolymers or blends of these. Other desirable materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefins, polyimides, mixtures and/or combinations thereof. Exemplary release materials for extrusion from dies described herein, methods described herein, and for composite layers described herein include silicone-grafted polyolefins such as those described in U.S. Pat. No. 6,465,107 (Kelly) and U.S. Pat. No. 3,471,588 (Kanner et al.), silicone block copolymers such as those described in PCT Publication No. WO96039349, published Dec. 12, 1996, low density polyolefin materials such as those described in U.S. Pat. No. 6,228,449 (Meyer), U.S. Pat. No. 6,348,249 (Meyer), and U.S. Pat. No. 5,948,517 (Adamko et al.), the disclosures of which are incorporated herein by reference.

In some embodiments, at least one of the first, second, third, or fourth materials comprises an adhesive (including pressure sensitive adhesives). In some embodiments, netting described herein, at least some of the polymeric strands comprise a first polymer that is a thermoplastic (e.g., adhesives, nylons, polyesters, polyolefins, polyurethanes, elastomers (e.g., styrenic block copolymers), and blends thereof).

In some embodiments, one or both of the major surfaces of nettings described herein comprise a hot melt or pressure sensitive adhesive. In some embodiments, the first polymeric strands and the second polymeric strands are both formed with an over/under arrangement. In particular, the first polymeric strands may have a first major surface of a first polymeric material and a second major surface of a second, different polymeric material, and the second polymeric strands may have a first major surface of a third polymeric material and a second major surface of a fourth, polymeric material. The die design for this scenario utilizes cavities. In some embodiments, the first polymeric strands and the second polymeric strands are both formed with a layered arrangement. In particular, the first polymeric strands may have a first major surface and a second major surface of a first polymeric material sandwiching a center of a second, different polymeric material, and the second polymeric strands may have first and second major surface of a third polymeric material sandwiching a center of a fourth, polymeric material. The die design for this scenario utilizes four cavities.

In some embodiments, polymeric materials used to make nettings described herein may comprise a colorant (e.g., pigment and/or dye) for functional (e.g., optical effects) and/or aesthetic purposes (e.g., each has different color/shade). Suitable colorants are those known in the art for use in various polymeric materials. Exemplary colors imparted by the colorant include white, black, red, pink, orange, yellow, green, aqua, purple, and blue. In some embodiments, it is desirable level to have a certain degree of opacity for one or more of the polymeric materials. The amount of colorant(s) to be used in specific embodiments can be readily determined by those skilled in the (e.g., to achieve desired color, tone, opacity, transmissivity, etc.). If desired, the polymeric materials may be formulated to have the same or different colors. When colored strands are of a relatively fine (e.g., less than 50 micrometers) diameter, the appearance of the web may have a shimmer reminiscent of silk.

Strands made using methods described herein do not substantially cross over each other (i.e., at least 50 (at least 55, 60, 65, 70, 75, 80, 85, 90, 95, 99, or even 100) percent by number).

In some embodiments, nettings described herein have a thickness up to 750 micrometers (in some embodiments, up to 500 micrometers, 250 micrometers, 100 micrometers, 75 micrometers, 50 micrometers, or even up to 25 micrometers; in a range from 10 micrometers to 750 micrometers, 10 micrometers to 750 micrometers, 10 micrometers to 500 micrometers, 10 micrometers to 250 micrometers, 10 micrometers to 100 micrometers, 10 micrometers to 75 micrometers, 10 micrometers to 50 micrometers, or even 10 micrometers to 25 micrometers).

In some embodiments, the polymeric strands have an average width in a range from 10 micrometers to 500 micrometers (in a range from 10 micrometers to 400 micrometers, or even 10 micrometers to 250 micrometers).

In some embodiments, netting described herein, the bond regions have an average largest dimension perpendicular to the strand thickness, wherein the polymeric strands have an average width, and wherein the average largest dimension of the bond regions is at least two (in some embodiments, at least 2.5, 3, 3.5, or even at least 4) times greater than the average width of the polymeric strands.

In some embodiments, the first material layer has a thickness in a range from 2 micrometers to 750 micrometers (in some embodiments, in a range from 5 micrometers to 500 micrometers, or even 25 micrometers to 250 micrometers). In some embodiments, the second material layer has a thickness in a range from 2 micrometers to 750 micrometers (in some embodiments, in a range from 5 micrometers to 500 micrometers, or even 25 micrometers to 250 micrometers). In some embodiments, the third material layer has a thickness in a range from 2 micrometers to 750 micrometers (in some embodiments, in a range from 5 micrometers to 500 micrometers, or even 25 micrometers to 250 micrometers). In some embodiments, the fourth material layer has a thickness in a range from 2 micrometers to 750 micrometers (in some embodiments, in a range from 5 micrometers to 500 micrometers, or even 25 micrometers to 250 micrometers). In some embodiments, the fifth material layer has a thickness in a range from 2 micrometers to 750 micrometers (in some embodiments, in a range from 5 micrometers to 500 micrometers, or even 25 micrometers to 250 micrometers). In some embodiments, the sixth material layer has a thickness in a range from 2 micrometers to 750 micrometers (in some embodiments, in a range from 5 micrometers to 500 micrometers, or even 25 micrometers to 250 micrometers).

In some embodiments, nettings described herein have a basis weight in a range from 5 g/m$^2$ to 600 g/m$^2$ (in some embodiments, 10 g/m$^2$ to 600 g/m$^2$, 10 g/m$^2$ to 400 g/m$^2$, or even 400 g/m$^2$ to 600 g/m$^2$), for example, nettings as-made from dies described herein. In some embodiments, nettings described herein after being stretched have a basis weight in a range from 0.5 g/m$^2$ to 40 g/m$^2$ (in some embodiments, 1 g/m$^2$ to 20 g/m$^2$).

In some embodiments, netting described herein has a strand pitch (i.e., center point-to-center point of adjacent bonds in the machine direction) in a range from 0.5 mm to 20 mm (in some embodiments, in a range from 0.5 mm to 10 mm).

It has been observed that when some of the embodiments of netting made according to the present disclosure are stretched, they will relax to a length that is less than their original length before stretching. While not wishing to be bound by theory, it is believed that this is due to curling of the bond regions within the netting structure.

Optionally, nettings described herein are attached to a backing. The backings may be, for example, one of a film, net, or non-woven. Films may be particularly desirable, for example, for applications utilizing clear printing or graphics. Nonwovens or nets may be particularly desirable, for example, where a softness and quietness that films typically do not have is desired. The netting may be stretched and bonded between at least two layers of film or nonwoven where the bond points have a plurality (at least two) of bond points that do not include the netting in the bond. Alternatively, an unstretched netting could be bonded between at least two layers of film or nonwoven where the bond points have a plurality (at least two) of bond points that do not include the netting in the bond. These constructions may require subsequent stretching, either localized ("ring rolling") or global, to become an activated elastic laminate.

In some embodiments, nettings described herein are elastic. In some embodiments, the polymeric strands have a machine direction and a cross-machine direction, wherein the netting or arrays of polymeric strands is elastic in machine direction, and inelastic in the cross-machine direction. In some embodiments, the polymeric strands have a machine direction and a cross-machine direction, wherein the netting or arrays of polymeric strands is inelastic in machine direction, and elastic in the cross-machine direction. Elastic means that the material will substantially resume its original shape after being stretched (i.e., will sustain only small permanent set following deformation and relaxation which set is less than 50 percent (in some embodiments, less than 25, 20, or even less than 10 percent) of the original length at moderate elongation (i.e., about 400-500%; in some embodiments, up to 300% to 1200%, or even up to 600% to 800%) elongation at room temperature). The elastic material can be both pure elastomers and blends with an elastomeric phase or content that will still exhibit substantial elastomeric properties at room temperature.

It is within the scope of the instant disclosure to use heat-shrinkable and non-heat shrinkable elastics. Non-heat shrinkable means that the elastomer, when stretched, will substantially recover sustaining only a small permanent set as discussed above at room temperature (i.e., about 25° C.).

In some embodiments of netting described herein, the array of polymeric strands exhibits at least one of diamond-shaped or hexagonal-shaped openings.

In some embodiments, the polymeric strands have an average width in a range from 10 micrometers to 500 micrometers (in a range from 10 micrometers to 400 micrometers, or even 10 micrometers to 250 micrometers).

In some embodiments, the strands (i.e., the first strands, second strands, and bond regions, and other optional strands, each have thicknesses that are substantially the same.

In some embodiments, the bond regions have an average largest dimension perpendicular to the strand thickness, and wherein the average largest dimension of the bond regions is at least two (in some embodiments, at least 3, 4, 5, 10, or even at least 15) times greater than the average width of at least one of the first strands or the second strands.

In some embodiments, netting described herein includes an array of engagement posts (e.g., hooks) for engaging with the netting. Engagement hooks can be made as is known in the art (see, for example, U.S. Pat. No. 5,077,870 (Melbye et al.)).

Nettings of polymeric strands described herein have a variety of uses, including wound care and other medical applications (e.g., elastic bandage-like material, surface layer for surgical drapes and gowns, and cast padding), tapes (including for medical applications), filtration, absorbent articles (e.g., diapers and feminine hygiene products) (e.g., as a layer(s) within the articles and/or as part of an attachment system for the articles or elastic components), pest control articles (e.g., mosquito nettings), geotextile applications (e.g., erosion control textiles), water/vapor management in clothing, reinforcement for nonwoven articles (e.g., paper towels), self bulking articles (e.g., for packaging) where the netting thickness is increased by stretching nettings with first strands have average first yield strength, and wherein the second strands have an average second yield strength that is different (e.g., at least 10 percent different) than the first yield strength, floor coverings (e.g., rugs and temporary mats), grip supports for tools, athletic articles, breathable elastic wrist and headbands, pattern coated adhesives, and pattern coated adhesives.

Advantages of some embodiments of nettings described herein when used as a backing, for example, for some tapes and wound dressings can include conformability, particularly in the cross direction (e.g., at least 50% elongation in the machine direction).

In some embodiments, nettings described herein are made of, or coated with, hydrophilic material to make them absorbent. In some embodiments, nettings described herein are useful as wound absorbents to remove excess exudate from wounds, and in some embodiments, nettings described herein are made of bioresorbable polymers.

In some filtration applications, the netting can be used, for example, to provide spacers between filtering layers for filtration packs and/or to provide rigidity and support for filtration media. In some embodiments, several layers of the netting are used, where each layer is set to provide optimal filtering. Also, in some embodiments, the elastic feature of some nettings described herein can facilitate expansion the filter as the filter fills up.

In some embodiments, nettings described herein have high and low modulus strands such that stretching netting having a curled bond area can generate a lofted, accessible fiber for hook attachment (i.e., for an attachment system). In such oriented nettings attachment loops can have fiber strengths that are greater than unoriented nettings.

In some embodiments, nettings described herein that are elastic can flex in the machine direction, cross direction, or both directions, which can provide, for example, comfort and fit for diapers and the like. Elastic netting can also provide a breathable, soft, and flexible attachment mechanism (e.g., elastic netting can be attached to posts that fit through the elastic net, the elastic netting can be made with a ribbon region section attached to the netting to provide the fingerlift, the elastic can be made as elastic in one direction and inelastic in the second direction with an elastic and inelastic strand, or the ribbon region section can have molded hooks to provide attachment to a loop).

In some embodiments, nettings described herein useful as grip supports for tools, athletic articles, etc. are made using high friction polymers.

Some embodiments of nettings described herein can be used as or in disposable absorbent articles that may be useful, for example as personal absorbent articles for absorbing bodily fluids (e.g., perspiration, urine, blood, and menses) and disposable household wipes used to clean up similar fluids or typical household spills.

A particular example of a disposable absorbent article comprising nettings described herein are disposable absorbent garments such as infant diapers or training pants, products for adult incontinence, feminine hygiene products (e.g., sanitary napkins and panty liners). A typical disposable absorbent garment of this type is formed as a composite structure including an absorbent assembly disposed between a liquid permeable bodyside liner and a liquid impermeable outer cover. These components can be combined with other materials and features such as elastic materials and containment structures to form a product that is specifically suited to its intended purposes. Feminine hygiene tampons are also well known and generally are constructed of an absorbent assembly and sometimes an outer wrap of a fluid pervious material.

Strands described herein have a variety of uses including fishing lines, and elastic versions for diapers.

EXEMPLARY EMBODIMENTS

1A. A netting comprising an array of polymeric strands periodically joined together at bond regions throughout the array, the netting has first and second, generally opposed major surfaces, wherein the bond regions are generally perpendicular to the first and second major surfaces, wherein the array comprises a first plurality of strands having first and second, generally opposed major surfaces, wherein the array comprises a second plurality of strands having first and second, generally opposed major surfaces, wherein the first major surface of the netting comprises the first major surfaces of the first and second plurality of strands, wherein the second major surface of the netting comprises the second major surfaces of the first and second plurality of strands, wherein the first major surface of the first plurality of strands comprises a first material, wherein the second major surface of the first plurality of strands comprises a second material, wherein the first major surface of the second plurality of strands comprises a third material, wherein the second major surface of the second plurality of strands comprises a fourth material, wherein the first and second materials are different, and wherein the first material does not extend to the second major surface of the first plurality of strands.

2A. The netting of Exemplary Embodiment 1A, wherein the third material does not extend to the second major surface of the second plurality of strands.

3A. The netting of either Exemplary Embodiment 1A or 2A, wherein the first and third materials are the same.

4A. The netting of either Exemplary Embodiment 1A or 2A, wherein the first, third, and fourth materials are the same.

5A. The netting of either Exemplary Embodiment 1A or 2A, wherein the first and fourth materials are the same.

6A. The netting of either Exemplary Embodiment 1A or 2A, wherein the first, second, third, and fourth materials are different from each other.

7A. The netting of either Exemplary Embodiment 1A or 2A, wherein the first and third materials are the same, and wherein the fourth is different than the first, second, and third materials.

8A. The netting of either Exemplary Embodiment 1A or 2A, wherein the first and fourth materials are the same, wherein the first and second materials are different than the third material.

9A. The netting of either Exemplary Embodiment 1A or 2A, wherein the first and third materials are the same, and wherein the second and fourth materials are the same.

10A. The netting of either Exemplary Embodiment 1A or 2A, wherein the first and fourth materials are the same, and wherein the second and third materials are the same.

11A. The netting of any preceding Exemplary Embodiment, wherein at least one of the first, second, third, or fourth materials comprises an adhesive.

12A. The netting of any of Exemplary Embodiments 1A to 10A, wherein at least two of the first, second, third, or fourth materials comprises an adhesive.

13A. The netting of any of Exemplary Embodiments 1A to 10A, wherein at least three of the first, second, third, or fourth materials comprises an adhesive.

14A. The netting of any of Exemplary Embodiments 1A to 10A, wherein each of the first, second, third, or fourth materials comprises an adhesive.

15A. The netting of any of Exemplary Embodiments 1A to 10A, wherein at least one of the first, second, third, or fourth materials comprises a pressure sensitive adhesive.

16A. The netting of any of Exemplary Embodiments 1A to 10A, wherein at least two of the first, second, third, or fourth materials comprises a pressure sensitive adhesive.

17A. The netting of any of Exemplary Embodiments 1A to 10A, wherein at least three of the first, second, third, or fourth materials comprises a pressure sensitive adhesive.

18A. The netting of any of Exemplary Embodiments 1A to 10A, wherein each of the first, second, third, or fourth materials comprises a pressure sensitive adhesive.

19A. The netting of any preceding Exemplary Embodiment, wherein the first material layer has a thickness in a range from 2 micrometers to 750 micrometers (in some embodiments, in a range from 5 micrometers to 500 micrometers, or even 25 micrometers to 250 micrometers).

20A. The netting of any preceding Exemplary Embodiment, wherein the second material layer has a thickness in a range from 2 micrometers to 750 micrometers (in some embodiments, in a range from 5 micrometers to 500 micrometers, or even 25 micrometers to 250 micrometers).

21A. The netting of any preceding Exemplary Embodiment, wherein the third material layer has a thickness in a range from 2 micrometers to 750 micrometers (in some embodiments, in a range from 5 micrometers to 500 micrometers, or even 25 micrometers to 250 micrometers).

22A. The netting of any preceding Exemplary Embodiment, wherein the fourth material layer has a thickness in a range from 2 micrometers to 750 micrometers (in some embodiments, in a range from 5 micrometers to 500 micrometers, or even 25 micrometers to 750 micrometers).

23A. The netting of any preceding Exemplary Embodiment further comprising a fifth, different material between the first and second materials.

24A. The netting of any preceding Exemplary Embodiment further comprising a sixth, different material between the third and fourth materials.

25A. The netting of any preceding Exemplary Embodiment, wherein the polymeric strands do not substantially cross over each other (i.e., at least 50 (at least 55, 60, 65, 70, 75, 80, 85, 90, 95, 99, or even 100) percent by number).

26A. The netting of any preceding Exemplary Embodiment having a basis weight in a range from 5 g/m$^2$ to 600 g/m$^2$ (in some embodiments, 10 g/m$^2$ to 600 g/m$^2$, 10 g/m$^2$ to 400 g/m$^2$, or even 400 g/m$^2$ to 600 g/m$^2$).

27A. The netting of any preceding Exemplary Embodiment having a basis weight in a range from 0.5 g/m$^2$ to 40 g/m$^2$ (in some embodiments, 1 g/m$^2$ to 20 g/m$^2$).

28A. The netting of any preceding Exemplary Embodiment having a strand pitch (i.e., center point-to-center point of adjacent bonds in the machine direction) in a range from 0.5 mm to 20 mm (in some embodiments, in a range from 0.5 mm to 10 mm).

29A. The netting of any preceding Exemplary Embodiment that is elastic.

30A. The netting of any preceding Exemplary Embodiment having a machine direction and a cross-machine direction, wherein the netting is elastic in machine direction, and inelastic in the cross-machine direction.

31A. The netting of any of Exemplary Embodiments 1A to 29A having a machine direction and a cross-machine direction, wherein the netting is inelastic in the machine direction, and elastic in the cross-machine direction.

32A. The netting of any preceding Exemplary Embodiment, wherein at least some of the polymeric stands include at least one of a dye or pigment therein.

33A. The netting of any preceding Exemplary Embodiment, wherein the array of polymeric strands exhibits at least one of diamond-shaped or hexagonal-shaped openings.

34A. The netting of any preceding Exemplary Embodiment, wherein at least some of the polymeric strands comprise a first polymer that is a thermoplastic (e.g., adhesives, nylons, polyesters, polyolefins, polyurethanes, elastomers (e.g., styrenic block copolymers), and blends thereof).

35A. The netting of any preceding Exemplary Embodiment, wherein the first strands have an average width in a range from 10 micrometers to 500 micrometers (in a range from 10 micrometers to 400 micrometers, or even 10 micrometers to 250 micrometers).

36A. The netting of any preceding Exemplary Embodiment, wherein the second strands have an average width in a range from 10 micrometers to 500 micrometers (in a range from 10 micrometers to 400 micrometers, or even 10 micrometers to 250 micrometers).

37A. The netting of any preceding Exemplary Embodiment where the netting is stretched.

38A. The netting of any preceding Exemplary Embodiment, wherein the bond regions have an average largest dimension perpendicular to the strand thickness, wherein the polymeric strands have an average width, and wherein the average largest dimension of the bond regions is at least 2 (in some embodiments, at least 2.5, 3, 3.5, or even at least 4) times greater than the average width of the polymeric strands.

1B. A method of making the netting of any of Exemplary Embodiments 1A to 38A, the method comprising:

providing an extrusion die comprising a plurality of shims positioned adjacent to one another, the shims together defining at least a first cavity, a second cavity, and a dispensing surface, wherein the dispensing surface has a first array of dispensing orifices alternating with a second array of dispensing orifices, wherein at least the first dispensing orifices are defined by an array of first vestibules, and wherein the plurality of shims comprises a plurality of a repeating sequence of shims, wherein the repeating sequence comprises: shims that provide a fluid passageway between the first cavity and one of the first vestibules, shims that provide a second passageway extending from the second cavity to the same vestibule, such that the area where the second fluid passageway enters the first vestibules is below the area where the first fluid passageway enters the first vestibules; and dispensing first polymeric strands from the first dispensing orifices at a first strand speed while simultaneously dispensing second polymeric strands from the second dispensing orifices at a second strand speed, wherein one of the strand speeds is at least 2 (in some embodiments, in a range from 2 to 6, or even 2 to 4) times the other strand speed to provide the netting.

2B. The method of Exemplary Embodiment 1B, wherein the extrusion die further comprises a third passageway extending from a cavity to the first vestibule, such that the area where the second fluid passageway enters the first vestibule is above the area where the third fluid passageway enters the first vestibule.

3B. The method of either Exemplary Embodiments 1B or 2B, wherein each of the second dispensing orifices are defined by a second vestibule, and wherein each second vestibule has at least two passageways extending from it each to a different cavity, such that the area where one of those passageways enters the second vestibule is above the area where the other of those passageways enters the second vestibule.

1C. A netting comprising an array of polymeric strands periodically joined together at bond regions throughout the array, the netting has first and second, generally opposed major surfaces, wherein the bond regions are generally perpendicular to the first and second major surfaces, wherein the array comprises a first plurality of strands having first and second, generally opposed major surfaces, wherein the array comprises a second plurality of strands having first and second, generally opposed major surfaces, wherein the first major surface of the netting comprises the first major surfaces of the first and second plurality of strands, wherein the second major surface of the netting comprises the second major surfaces of the first and second plurality of strands, wherein the first major surface of the first plurality of strands comprises a first material, wherein the second major surface of the first plurality of strands comprises a second material, wherein the first major surface of the second plurality of strands comprises a third material, wherein the second major surface of the second plurality of strands comprises a fourth material, wherein there is a fifth material disposed between the first and second materials, wherein there is a sixth material disposed between the third and fourth materials, wherein the first and fifth materials are different, wherein the first, second, third, and fourth are the same, and wherein the first material does not extend to the second major surface of the first plurality of strands.

2C. The netting of Exemplary Embodiment 1C, wherein the third material does not extend to the second major surface of the second plurality of strands.

3C. The netting of either Exemplary Embodiment 1C or 2C, wherein the first and sixth materials are the same.

4C. The netting of either Exemplary Embodiment 1C or 2C, wherein the fifth and sixth materials are the same.

5C. The netting of any preceding C Exemplary Embodiment, wherein at least one of the first, second, third, or fourth materials comprises an adhesive.

6C. The netting of any of Exemplary Embodiments 1C to 4C, wherein at least two of the first, second, third, or fourth materials comprises an adhesive.

7C. The netting of any of Exemplary Embodiments 1C to 4C, wherein at least three of the first, second, third, or fourth materials comprises an adhesive.

8C. The netting of any of Exemplary Embodiments 1C to 4C, wherein each of the first, second, third, or fourth materials comprises an adhesive.

9C. The netting of any of Exemplary Embodiments 1C to 4C, wherein at least one of the first, second, third, or fourth materials comprises a pressure sensitive adhesive.

10C. The netting of any of Exemplary Embodiments 1C to 4C, wherein at least two of the first, second, third, or fourth materials comprises a pressure sensitive adhesive.

11C. The netting of any of Exemplary Embodiments 1C to 4C, wherein at least three of the first, second, third, or fourth materials comprises a pressure sensitive adhesive.

12C. The netting of any of Exemplary Embodiments 1C to 4C, wherein each of the first, second, third, or fourth materials comprises a pressure sensitive adhesive.

13C. The netting of any preceding C Exemplary Embodiment, wherein the first material layer has a thickness in a range from 2 micrometers to 750 micrometers (in some embodiments, in a range from 5 micrometers to 500 micrometers, or even 25 micrometers to 250 micrometers).

14C. The netting of any preceding C Exemplary Embodiment, wherein the second material layer has a thickness in a range from 2 micrometers to 750 micrometers (in some embodiments, in a range from 5 micrometers to 500 micrometers, or even 25 micrometers to 250 micrometers).

15C. The netting of any preceding C Exemplary Embodiment, wherein the third material layer has a thickness in a range from 2 micrometers to 750 micrometers (in some embodiments, in a range from 5 micrometers to 500 micrometers, or even 25 micrometers to 250 micrometers).

16C. The netting of any preceding C Exemplary Embodiment, wherein the fourth material layer has a thickness in a range from 2 micrometers to 750 micrometers (in some embodiments, in a range from 5 micrometers to 500 micrometers, or even 25 micrometers to 750 micrometers).

17C. The netting of any preceding C Exemplary Embodiment, wherein the fifth material layer has a thickness in a range from 2 micrometers to 750 micrometers (in some embodiments, in a range from 5 micrometers to 500 micrometers, or even 25 micrometers to 250 micrometers).

18C. The netting of any preceding C Exemplary Embodiment, wherein the sixth material layer has a thickness in a range from 2 micrometers to 750 micrometers (in some embodiments, in a range from 5 micrometers to 500 micrometers, or even 25 micrometers to 250 micrometers).

19C. The netting of any preceding C Exemplary Embodiment, wherein the polymeric strands do not substantially cross over each other (i.e., at least 50 (at least 55, 60, 65, 70, 75, 80, 85, 90, 95, 99, or even 100) percent by number).

20C. The netting of any preceding C Exemplary Embodiment having a basis weight in a range from 5 $g/m^2$ to 600 $g/m^2$ (in some embodiments, 10 $g/m^2$ to 600 $g/m^2$, 10 $g/m^2$ to 400 $g/m^2$, or even 400 $g/m^2$ to 600 $g/m^2$).

21C. The netting of any preceding C Exemplary Embodiment having a basis weight in a range from 0.5 $g/m^2$ to 40 $g/m^2$ (in some embodiments, 1 $g/m^2$ to 20 $g/m^2$).

22C. The netting of any preceding C Exemplary Embodiment having a strand pitch (i.e., center point-to-center point of adjacent bonds in the machine direction) in a range from 0.5 mm to 20 mm (in some embodiments, in a range from 0.5 mm to 10 mm).

23C. The netting of any preceding C Exemplary Embodiment that is elastic.

24C. The netting of any preceding C Exemplary Embodiment having a machine direction and a cross-machine direction, wherein the netting is elastic in machine direction, and inelastic in the cross-machine direction.

25C. The netting of any of Exemplary Embodiments 1C to 23C having a machine direction and a cross-machine direction, wherein the netting is inelastic in the machine direction, and elastic in the cross-machine direction.

26C. The netting of any preceding C Exemplary Embodiment, wherein at least some of the polymeric stands include at least one of a dye or pigment therein.

27C. The netting of any preceding C Exemplary Embodiment, wherein the array of polymeric strands exhibits at least one of diamond-shaped or hexagonal-shaped openings.

28C. The netting of any preceding C Exemplary Embodiment, wherein at least some of the polymeric strands comprise a first polymer that is a thermoplastic (e.g., adhesives, nylons, polyesters, polyolefins, polyurethanes, elastomers (e.g., styrenic block copolymers), and blends thereof).

29C. The netting of any preceding C Exemplary Embodiment, wherein the first strands have an average width in a range from 10 micrometers to 500 micrometers (in a range from 10 micrometers to 400 micrometers, or even 10 micrometers to 250 micrometers).

30C. The netting of any preceding C Exemplary Embodiment, wherein the second strands have an average width in a range from 10 micrometers to 500 micrometers (in a range from 10 micrometers to 400 micrometers, or even 10 micrometers to 250 micrometers).

31C. The netting of any preceding C Exemplary Embodiment where the netting is stretched.

32C. The netting of any preceding C Exemplary Embodiment, wherein the bond regions have an average largest dimension perpendicular to the strand thickness, wherein the polymeric strands have an average width, and wherein the average largest dimension of the bond regions is at least 2 (in some embodiments, at least 2.5, 3, 3.5, or even at least 4) times greater than the average width of the polymeric strands.

1D. A method of making the netting of any of Exemplary Embodiments 1C to 32C, the method comprising:

providing an extrusion die comprising a plurality of shims positioned adjacent to one another, the shims together defining at least a first cavity, a second cavity, and a dispensing surface, wherein the dispensing surface has a first array of dispensing orifices alternating with a second array of dispensing orifices, wherein at least the first dispensing orifices are defined by an array of first vestibules, and wherein the plurality of shims comprises a plurality of a repeating sequence of shims, wherein the repeating sequence comprises: shims that provide a fluid passageway between the first cavity and one of the first vestibules, shims that provide a second passageway extending from the second cavity to the same vestibule, such that the area where the second fluid passageway enters the first vestibules is below the area where the first fluid passageway enters the first vestibules; and dispensing first polymeric strands from the first dispensing orifices at a first strand speed while simultaneously dispensing second polymeric strands from the second dispensing orifices at a second strand speed, wherein one of the strand speeds is at least 2 (in some embodiments, in a range from 2 to 6, or even 2 to 4) times the other strand speed to provide the netting.

2D. The method of Exemplary Embodiment 1D, wherein the extrusion die further comprises a third passageway extending from a cavity to the first vestibule, such that the area where the second fluid passageway enters the first vestibule is above the area where the third fluid passageway enters the first vestibule.

3D. The method of either Exemplary Embodiments 1D or 2D, wherein each of the second dispensing orifices are defined by a second vestibule, and wherein each second vestibule has at least two passageways extending from it each to a different cavity, such that the area where one of those passageways enters the second vestibule is above the area where the other of those passageways enters the second vestibule.

1E. An extrusion die having at least first and second cavities, a first passageway extending from the first cavity into a first vestibule defining a first dispensing orifice, and a second passageway extending from the second cavity to the vestibule, such that the area where the first fluid passageway enters the vestibule is above the area where the second fluid passageway enters the vestibule.

2E. The extrusion die of Exemplary Embodiment 1E further comprising a third passageway extending from a cavity to the first vestibule, such that the area where the second fluid passageway enters the first vestibule is above the area where the third fluid passageway enters the first vestibule.

3E. The extrusion die of either Exemplary Embodiments 1E or 2E comprising a plurality of first vestibules, together defining a first dispensing array, and further comprising a plurality of second dispensing orifices, together defining a second dispensing array alternating along a dispensing surface with the first dispensing array, each of the second dispensing orifices having at least one passageway extending to a cavity.

4E. The extrusion die of Exemplary Embodiment 3E wherein the second dispensing orifices are defined by a second vestibule, and wherein each second vestibule has at least two passageways extending from it each to a different cavity, such that the area where one of those passageways enters the second vestibule is above the area where the other of those passageways enters the second vestibule.

1F. An extrusion die comprising a plurality of shims positioned adjacent to one another, the shims together defining at least a first cavity, a second cavity, and a dispensing surface, wherein the dispensing surface has an array of dispensing orifices defined by an array of vestibules, wherein the plurality of shims comprises a plurality of a repeating sequence of shims, wherein the repeating sequence comprises: shims that provide a fluid passageway between the first cavity and one of the vestibules, shims that provide a second passageway extending from the second cavity to the same vestibule, such that the area where the second fluid passageway enters the vestibule is below the area where the first fluid passageway enters the vestibule.

2F. The extrusion die of Exemplary Embodiment 1F further comprising a third passageway extending from a cavity to the first vestibule, such that the area where the second fluid passageway enters the first vestibule is above the area where the third fluid passageway enters the first vestibule.

3F. The extrusion die of either Exemplary Embodiments 1F or 2F comprising a plurality of first vestibules, together defining a first dispensing array, and further comprising a plurality of second dispensing orifices, together defining a second dispensing array alternating along a dispensing surface with the first dispensing array, each of the second dispensing orifices having at least one passageway extending to a cavity.

4F. The extrusion die of Exemplary Embodiment 3F wherein the second dispensing orifices are defined by a second vestibule, and wherein each second vestibule has at least two passageways extending from it each to a different cavity, such that the area where one of those passageways enters the second vestibule is above the area where the other of those passageways enters the second vestibule.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Example 1

A two layer coextruded net generally as depicted in FIG. 1 was produced using the die configuration generally as depicted in FIG. 17. The width of shims 1700, 1600, and 1500 was 0.004 inch (0.102 mm). The dispensing orifices that produced the first strands had a height of 0.015 inch (0.38 mm), and the dispensing orifices that produced the second strands had a height of 0.006 inch (0.15 mm). A 50% by weight blend of polypropylene (obtained under the trade designation "3155PP" from ExxonMobil, Irving, Tex.) and polypropylene copolymer (obtained under the trade designation "VISTAMAX 6202" from Exxon Mobil) was fed into the manifolds feeding the cavities having passageways that provided the upper layer of both the 0.38 mm and 0.15 mm dispensing orifices. The polymer blend that fed the 0.15 mm dispensing orifices was colored with 3 wt. % green color concentrate (obtained under the trade designation "3M Green" from Polyone, Elk Grove Village, Ill.), the polymer blend feeding the 0.38 mm opening was colored with 3 wt. % blue color concentrate (obtained under the trade designation "3M Blue" from Polyone). The cavities feeding the lower side of the vestibules behind the orifices were fed with polypropylene polymer (undyed; "3155PP"). The polymer feeding the 0.15 mm orifices was colored with 3 wt. % white color concentrate (obtained under the trade designation "WHITE POLYPROPYLENE PIGMENT" from Clariant, Minneapolis, Minn.), the polymer feeding the 0.38 mm orifices was colored with 3 wt. % pink color concentrate (obtained under the trade designation "WILD CHERRY POLYPROPYLENE PIGMENT" from Clariant). Each feed stream was fed at a rate of 1.25 lb./hr. (0.57 kg/hr.). The mismatch in velocity of adjacent strands created an oscillating collision of strands which bonds the first and second strands into a netting. This netting was dropped onto a quench roll. The quench roll temperature was set at 55° F. (12.8° C.). The line speed was 20 ft./min. (6.1 m/min.). Additional details follows:
Netting basis weight: 50 g/m$^2$
Bond length machine direction: 0.9 mm
Net bonding distance machine direction (pitch): 2.3 mm
First polymer strand width: 0.08 mm
First polymer strand height: 0.12 mm
Second polymer strand width: 0.06 mm
Second polymer strand height: 0.10 mm

Example 2

A three layer coextruded net generally as depicted in FIG. 2 was produced using the die configuration generally as depicted in FIG. 11. The dispensing orifices that produced the first strands had a height of 0.38 mm and a width of 0.41 mm. The dispensing orifices that produced the second strands had a height of 0.76 mm and a width of 0.41 mm. The cavities that provided the central layer for both sets of orifices were fed with polypropylene copolymer (obtained under the trade designation "INFUSE 9507" from Dow Chemical, Midland, Mich.). The cavities providing the top and bottom layers (as shown in FIG. 2) for both sets of orifices were fed with polypropylene ("3155 PP"). The flow rate of core material for the first strands was 1.7 kg/hr. The flow rate of core material for the second strands was 1.0 kg/hr. The flow rate of the material for the top and bottom layers (as shown in FIG. 2) of the first strands was 0.2 kg/hr. The flow rate of the material for the top and bottom layers (as shown in FIG. 2) of the second strands was 0.1 kg/hr. The temperature of the polymer melt was 210° C. Netting was extruded from a die 15 cm wide, assembled from multiple instances of the 16-shim repeating sequence of shims depicted in FIG. 11 assembled into a mount generally as depicted in FIGS. 12 and 13. The mismatch in velocity of adjacent strands created an oscillating collision of strands which bonded the individual strands into a netting. This net structure was dropped onto a quench roll. The quench roll temperature was set at 13° C. The line speed was 3.6 m/min. Additional details follows:
Netting basis weight: 90 g/m$^2$
Bond length machine direction: 1.8 mm
Net bonding distance machine direction (pitch): 6.3 mm
First polymer strand width: 0.29 mm
First polymer strand height: 0.29 mm
Second polymer strand width: 0.12 mm
Second polymer strand height: 0.20 mm

Example 3

A three layer coextruded net generally as depicted in FIG. 2 was produced using the die configuration generally as depicted in FIG. 11. The dispensing orifices that produced the first strands had a height of 0.015 inch (0.38 mm), and the dispensing orifices that produced the second strands had a height of 0.030 inch (0.76 mm). The cavities that provided the central layer for both sets of orifices were fed with polypropylene copolymer ("INFUSE 9507"). The cavities providing the top and bottom layers for the second set of orifices were fed with a dry blend of a styrenic block copolymer elastomer (obtained under the trade designation "KRATON 1114" from Kraton Polymers LLC, Houston, Tex.), and an aromatically-modified C5 petroleum hydrocarbon resin tackifier (obtained under the trade designation "WINGTAC PLUS" from Sartomer Co., Exton, Pa.). This dry blend created a slightly tacky adhesive. The flow rate of core material from the 0.76 mm orifices was 1.8 lb./hr. (0.82 kg/hr.). The flow rate of core material from the 0.38 orifices was 2 lb./hr. (0.91 kg/hr.). The flow rate of the adhesive for the second set of orifices was 0.55 lb./hr. (0.25 kg/hr.). Netting having the adhesive on its first and second major surfaces for the second set of strands was extruded from a die 15 cm wide, assembled from multiple instances of the 16-shim repeating sequence of shims depicted in FIG. 11 assembled into a mount generally as depicted in FIGS. 12 and 13. The mismatch in velocity of adjacent strands created an oscillating collision of strands which bonded the individual strands into a netting. This net structure was dropped onto a quench roll. The netting was comprised of one strand set with a single layer alternating with a second strand set with 3 layers. The quench roll temperature was set at 55° F. (12.8° C.). The line speed was 7.5 ft./min. (2.29 m/min.). Additional details follows:
Netting basis weight: 90 g/m$^2$
Bond length machine direction: 1.0 mm
Net bonding distance machine direction (pitch): 3.8 mm
First polymer strand width: 0.16 mm
First polymer strand height: 0.25 mm
Second polymer strand width: 0.17 mm
Second polymer strand height: 0.25 mm Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A netting comprising an array of filamentous collinear polymeric strands, wherein the array comprises a first plurality of strands having first and second, generally opposed major surfaces, wherein the array comprises a second plurality of strands having first and second, generally opposed major surfaces, wherein a first major surface of the netting comprises the first major surfaces of the first and second plurality of strands, wherein a second major surface of the netting comprises the second major surfaces of the first and second plurality of strands, wherein the first major surface of the first plurality of strands comprises a first material, wherein the second major surface of the first plurality of strands comprises a second material, wherein the first major surface of the second plurality of strands comprises a third material, wherein the second major surface of the second plurality of strands comprises a fourth material, wherein the first and second materials are different, and wherein the first material does not extend to the second major surface of the first plurality of strands, wherein the first polymeric strands and the second polymeric strands alternate and do not substantially cross over each other, and an exterior surface of the first polymeric strands and an exterior surface of the second polymeric strands are periodically bonded together to form bond regions throughout the array, wherein the bond regions are perpendicular to the first major surface of the netting and the second major surface of the netting, and wherein the bond regions comprise each of the first material, the second material, the third material and the fourth material and wherein at least three of the first, second, third, or fourth materials are different.

2. The netting of claim 1, wherein the third material does not extend to the second major surface of the second plurality of strands.

3. The netting of claim 1, wherein at least one of the first, second, third, or fourth materials comprises an adhesive.

4. The netting of claim 1, wherein at least two of the first, second, third, or fourth materials comprises an adhesive.

5. A method of making the netting of claim 1, the method comprising:

providing an extrusion die comprising a plurality of shims positioned adjacent to one another, the shims together defining at least a first cavity, a second cavity, and a dispensing surface, wherein the dispensing surface has a first array of dispensing orifices alternating with a second array of dispensing orifices, wherein at least the first dispensing orifices are defined by an array of first vestibules, and wherein the plurality of shims comprises a plurality of a repeating sequence of shims, wherein the repeating sequence comprises: shims that provide a fluid passageway between the first cavity and one of the first vestibules, shims that provide a second passageway extending from the second cavity to the same vestibule, such that the area where the second fluid passageway enters the first vestibules is below the area where the first fluid passageway enters the first vestibules; and dispensing first polymeric strands from the first dispensing orifices at a first strand speed while simultaneously dispensing second polymeric strands from the second dispensing orifices at a second strand speed, wherein one of the strand speeds is at least 2 times the other strand speed to provide the netting.

6. The netting of claim 3, wherein the adhesive is a pressure sensitive adhesive.

7. The netting of claim 4, wherein the adhesive is a pressure sensitive adhesive.

8. The netting of claim 1, wherein the array of polymeric strands comprises at least one of diamond-shaped or hexagonal-shaped openings.

9. The netting of claim 1, wherein the first, second, third and fourth materials are different from each other.

* * * * *

UNITED STATES PATENT AND TRADEMARK OFFICE
CERTIFICATE OF CORRECTION

| | |
|---|---|
| PATENT NO. | : 10,501,877 B2 |
| APPLICATION NO. | : 14/772117 |
| DATED | : December 10, 2019 |
| INVENTOR(S) | : Ronald Ausen |

It is certified that error appears in the above-identified patent and that said Letters Patent is hereby corrected as shown below:

In the Specification

Column 15
Line 27, Delete ""0 MHZ" and insert -- "0MHZ --, therefor.
Line 45, Delete "and or" and insert -- and/or --, therefor.

Signed and Sealed this
Seventh Day of July, 2020

Andrei Iancu
*Director of the United States Patent and Trademark Office*